(12) United States Patent
Shoji et al.

(10) Patent No.: US 9,903,476 B2
(45) Date of Patent: Feb. 27, 2018

(54) CYLINDRICAL SHAFT-SEALING MATERIAL OBTAINED FROM PILE WEAVE OR KNIT

(71) Applicants: SANWA TECHNO CO., LTD., Kobe-shi, Hyogo (JP); Susumu Shoji, Kobe-shi, Hyogo (JP)

(72) Inventors: Susumu Shoji, Kobe (JP); Kazuro Fukui, Kobe (JP)

(73) Assignees: Susumu Shoji, Kobe-shi, Hyogo (JP); SANWA TECHNO CO., LTD., Kobe-shi, Hyogo (JP)

( * ) Notice: Subject to any disclaimer, the term of this patent is extended or adjusted under 35 U.S.C. 154(b) by 0 days.

(21) Appl. No.: 14/655,524

(22) PCT Filed: Dec. 25, 2012

(86) PCT No.: PCT/JP2012/083445
§ 371 (c)(1),
(2) Date: Jun. 25, 2015

(87) PCT Pub. No.: WO2014/102897
PCT Pub. Date: Jul. 3, 2014

(65) Prior Publication Data
US 2015/0337966 A1    Nov. 26, 2015

(51) Int. Cl.
*F01D 11/02* (2006.01)
*F16J 15/3288* (2016.01)
*F16J 15/3268* (2016.01)

(52) U.S. Cl.
CPC ....... *F16J 15/3288* (2013.01); *F16J 15/3268* (2013.01)

(58) Field of Classification Search
CPC .. F16J 15/3288; F16J 15/3268; F16J 15/3272; F16J 15/3296

(Continued)

(56) References Cited

U.S. PATENT DOCUMENTS

| 4,269,420 | A | | 5/1981 | Persson |
| 4,779,904 | A | * | 10/1988 | Rich ............. B08B 15/002 |
| | | | | 277/355 |

(Continued)

FOREIGN PATENT DOCUMENTS

| DE | 10 2008 050 230 A1 | 4/2010 |
| JP | 55-132464 A | 10/1980 |

(Continued)

OTHER PUBLICATIONS

International Search Report dated Mar. 5, 2013 issued in corresponding application No. PCT/JP2012/083445 (2 pages).

*Primary Examiner* — Nathan Cumar
(74) *Attorney, Agent, or Firm* — Westerman, Hattori, Daniels & Adrian, LLP

(57) ABSTRACT

A rotational shaft seal member which does not cause leakage of powder and which has a slit capable of being enlarged as a result of occurrence of springback. Cylindrical shaft seal member 4b at powder container 1 includes pile 5 including woven/knit pile fabric 7 having cut pile 7b at the inside of cylindrical shaft seal member 4b and pile cylindrical support member 4c; the outside diameter 4e being capable of shrinkage as a result of external pressure, and being capable of enlargement as a result of pressure on the inside diameter 4d. When cylindrical shaft seal member 4b is inserted in attachment hole 2a of support frame 2 at the rotating body, attachment is achieved because slit 8 causes shrinkage of outside diameter 4e of cylindrical shaft seal member 4b, enlargement due to springback of slit 8 causing intimate contact with attachment hole 2a.

16 Claims, 18 Drawing Sheets

(58) Field of Classification Search
USPC .......................................................... 277/355
See application file for complete search history.

(56) References Cited

U.S. PATENT DOCUMENTS

| | | | | |
|---|---|---|---|---|
| 5,474,305 | A | * | 12/1995 | Flower ................ F16J 15/3288 |
| | | | | 277/355 |
| 6,880,829 | B1 | * | 4/2005 | Datta .................... F01D 11/08 |
| | | | | 277/350 |
| 2003/0043361 | A1 | | 3/2003 | Shoji et al. |
| 2004/0100033 | A1 | * | 5/2004 | Tong ..................... F16J 15/061 |
| | | | | 277/411 |
| 2008/0128996 | A1 | * | 6/2008 | Grace ................ F16J 15/3288 |
| | | | | 277/355 |

FOREIGN PATENT DOCUMENTS

| | | | | |
|---|---|---|---|---|
| JP | 2003-56713 | A | | 2/2003 |
| JP | 2005-201427 | A | | 7/2005 |
| JP | 2005201427 | A | * | 7/2005 |
| JP | 2008 026728 | | * | 2/2008 |
| JP | 2008-26728 | A | | 2/2008 |
| JP | 2008-26729 | A | | 2/2008 |
| JP | 2008026728 | A | * | 2/2008 |
| JP | 2008 026728 | A | * | 7/2008 |

* cited by examiner

[FIG. 1]
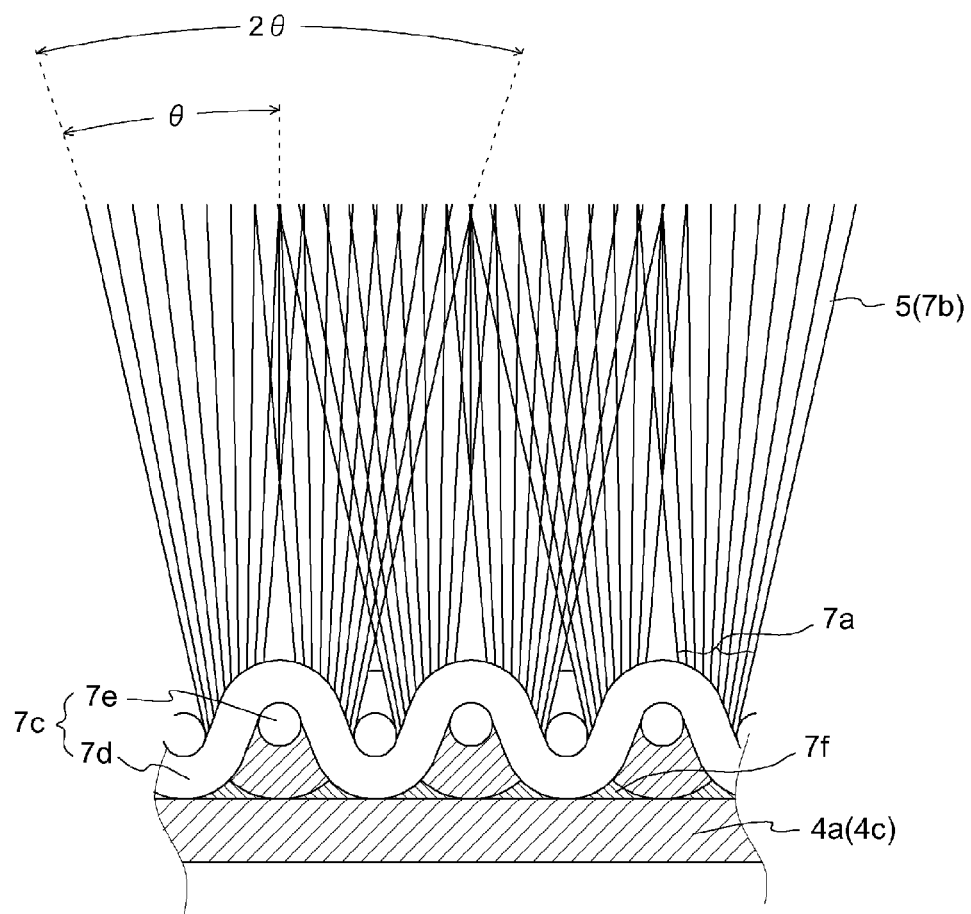

[FIG. 2]
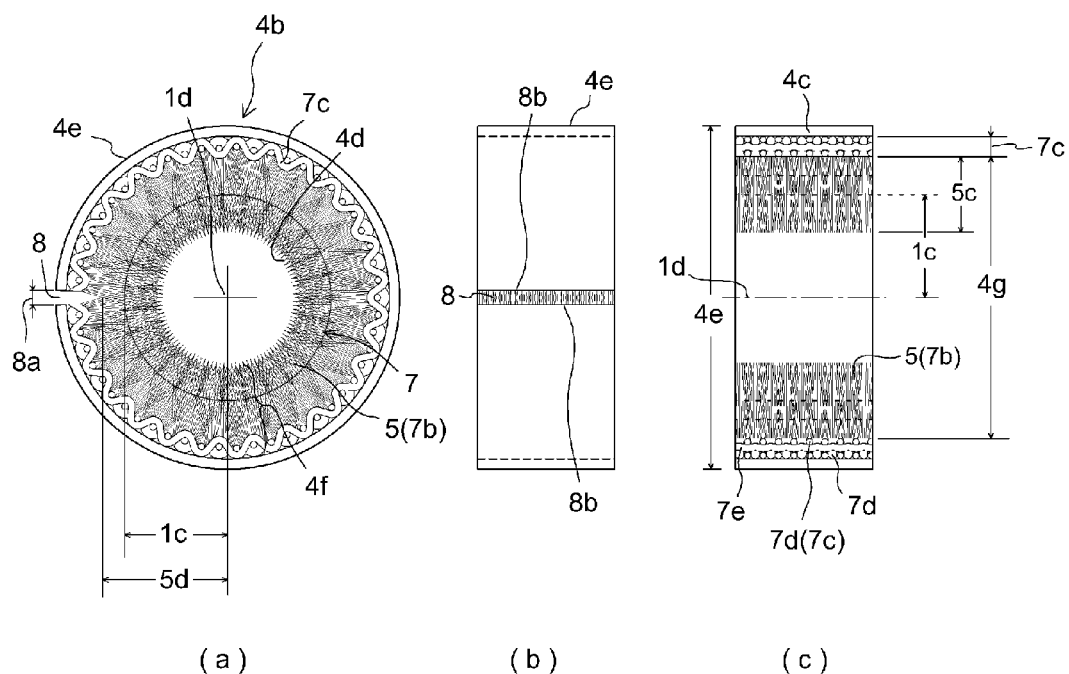
(a)     (b)     (c)

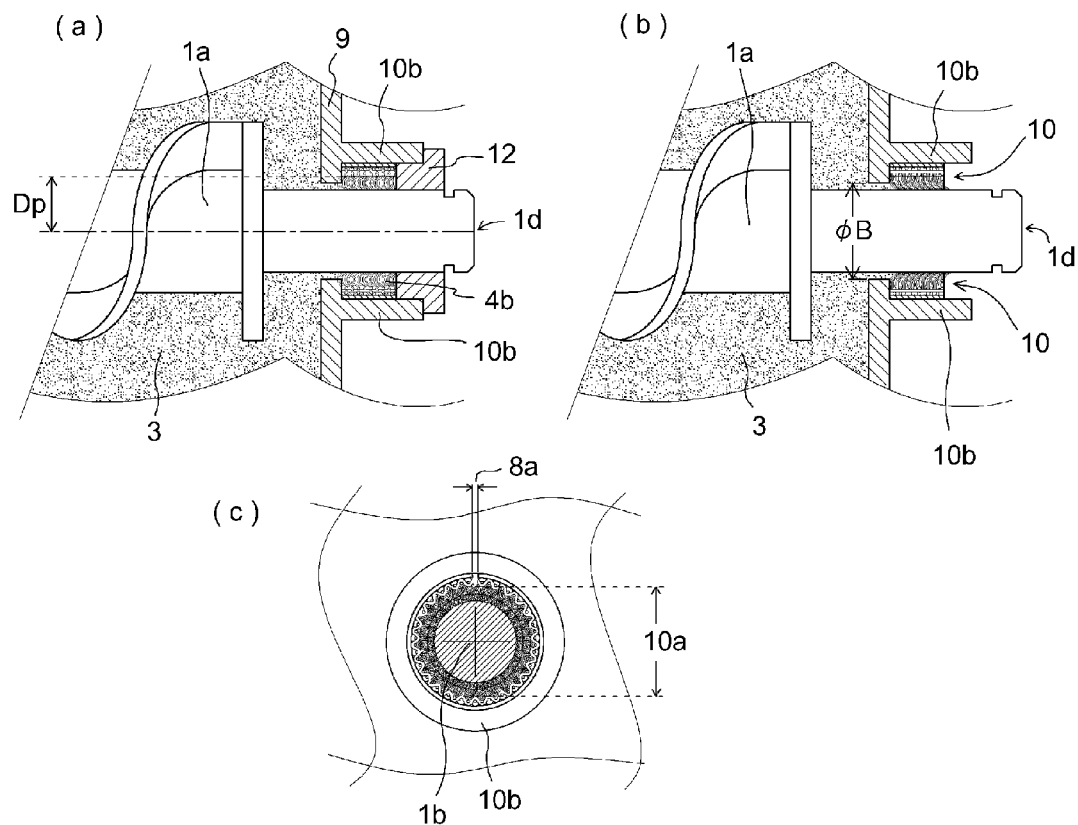
[FIG. 3]

[FIG. 4]
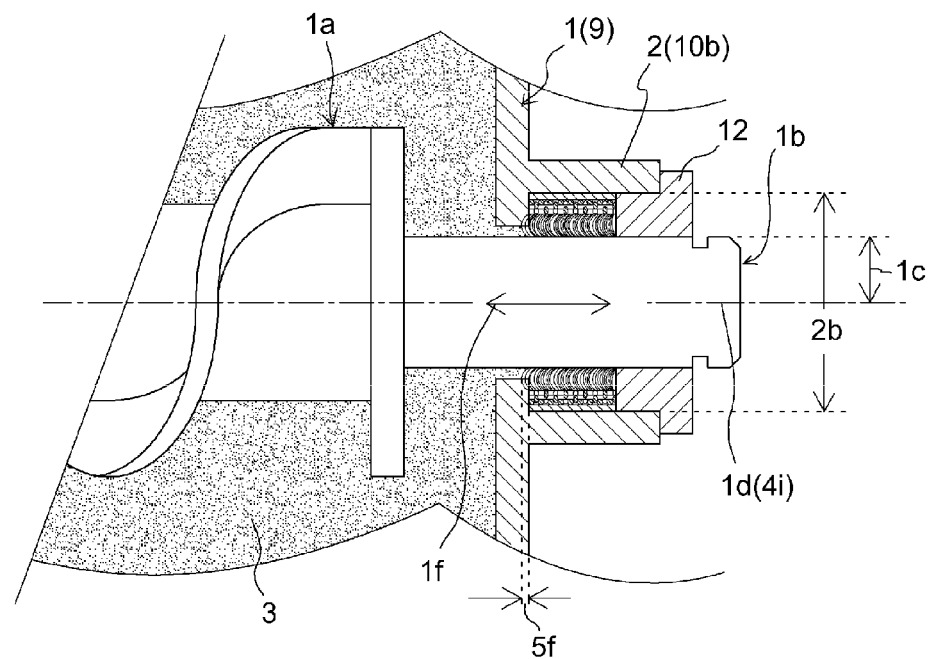

[FIG. 5]
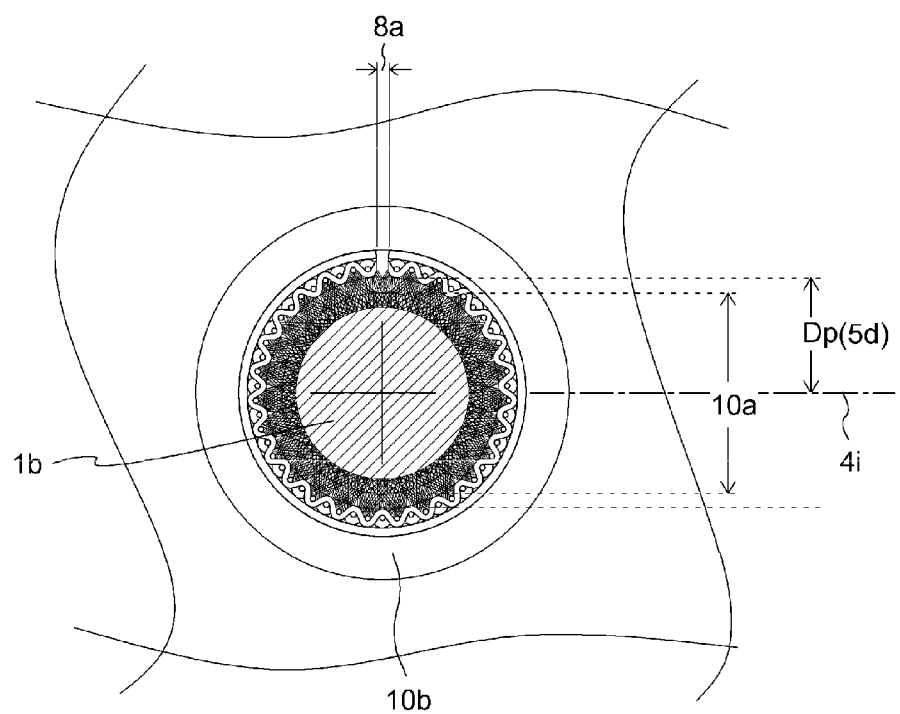

[FIG. 6]
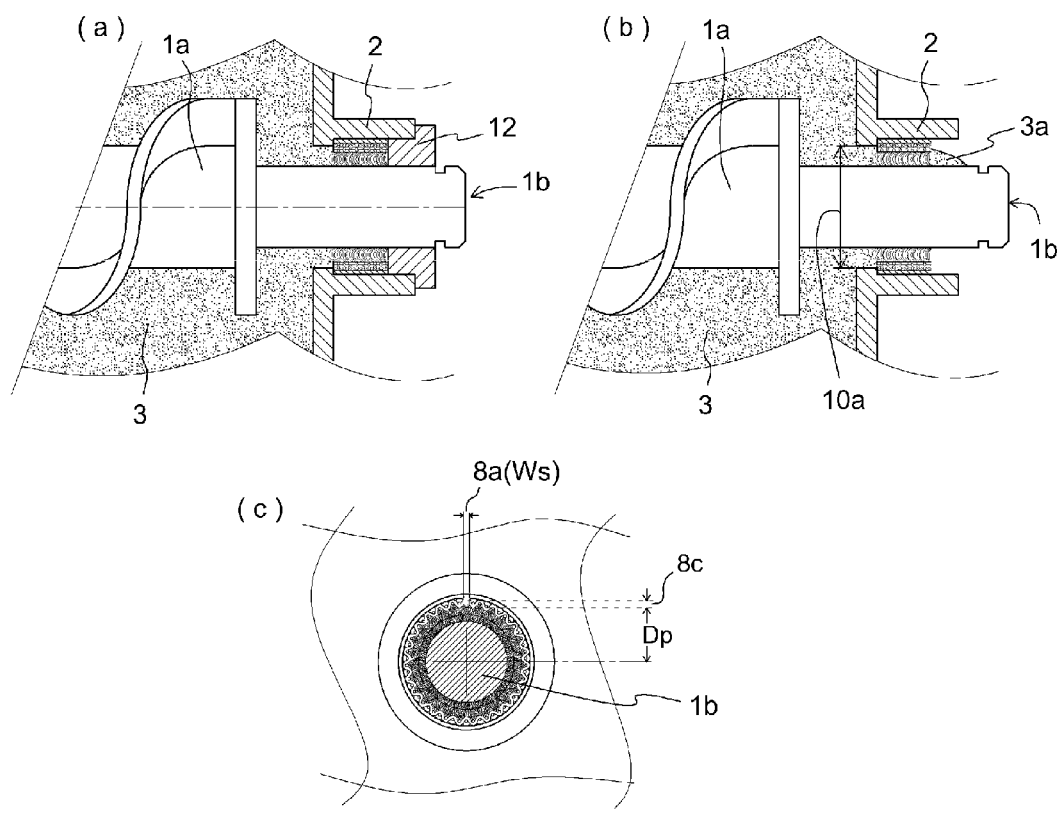

[FIG. 7]
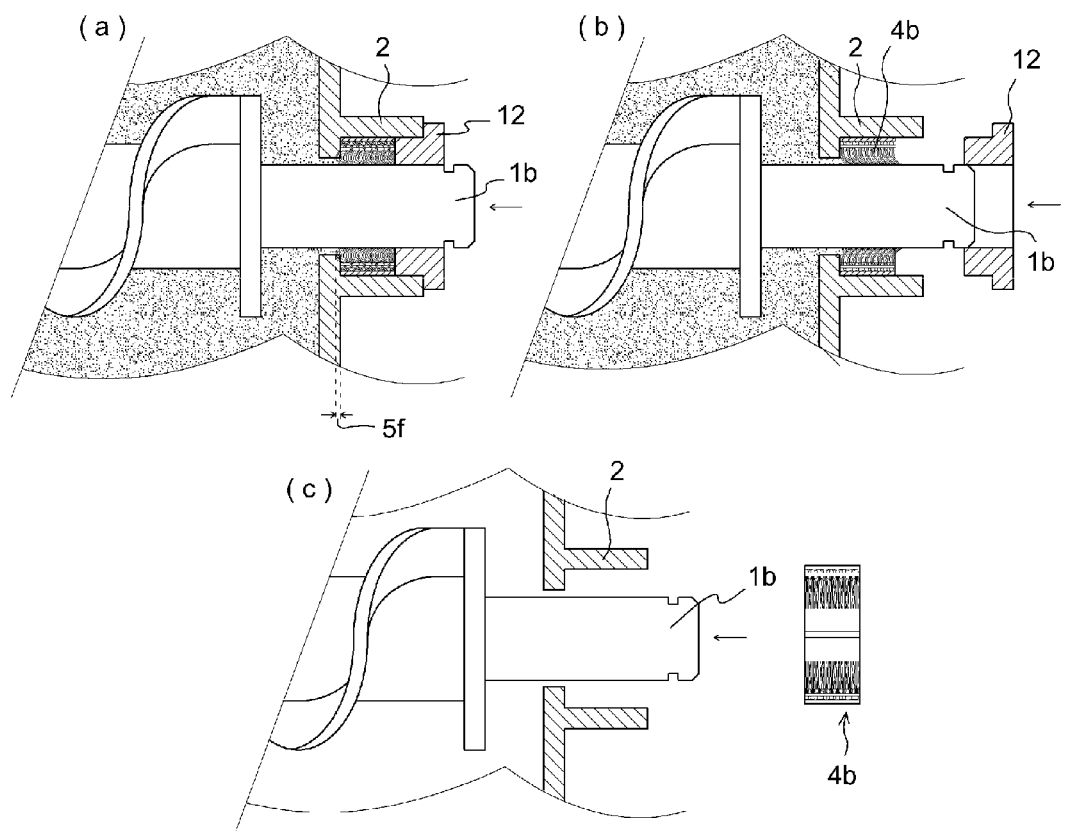

[FIG. 8]
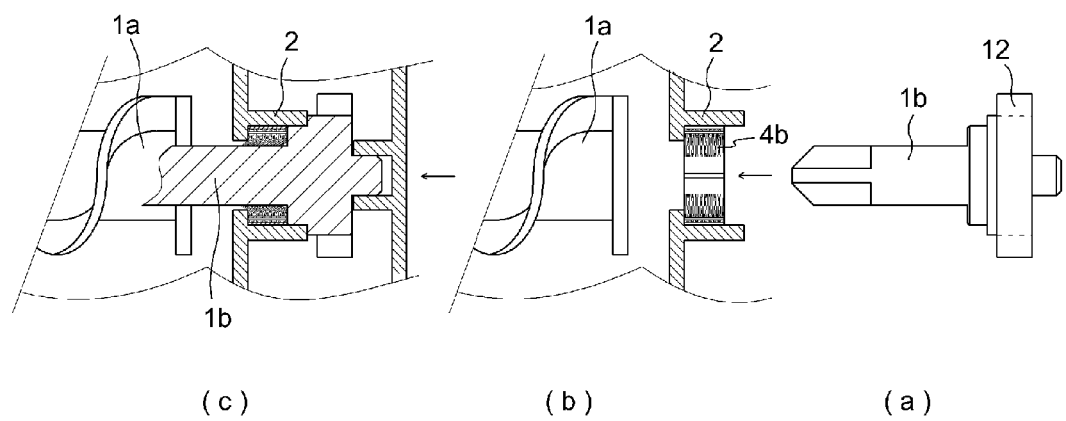
(c)　　　　　(b)　　　　　(a)

[FIG. 9]
(a) (Conceptual diagrams modeling fiber density)
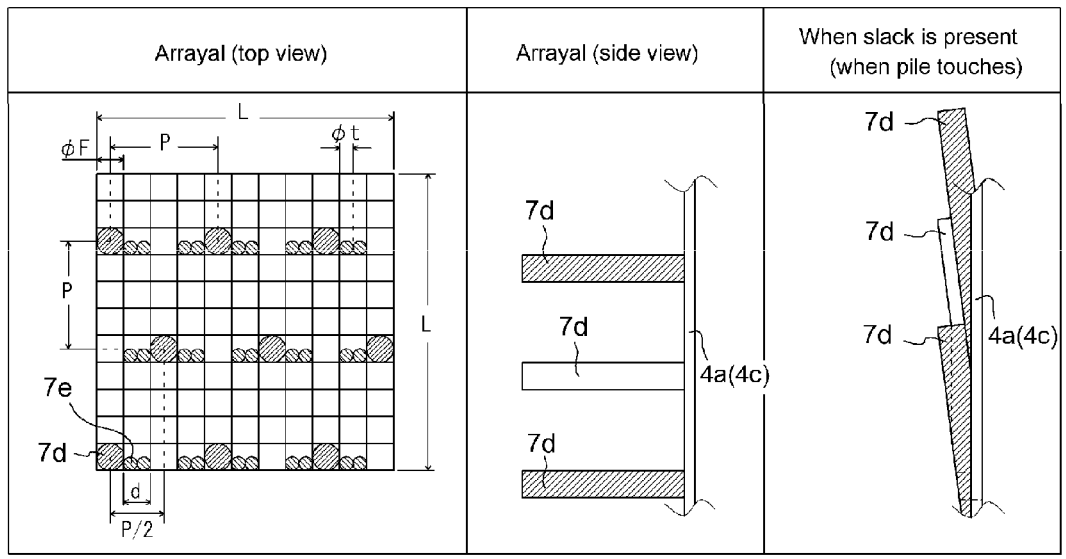
(b) (Conceptual diagrams modeling pile gap)
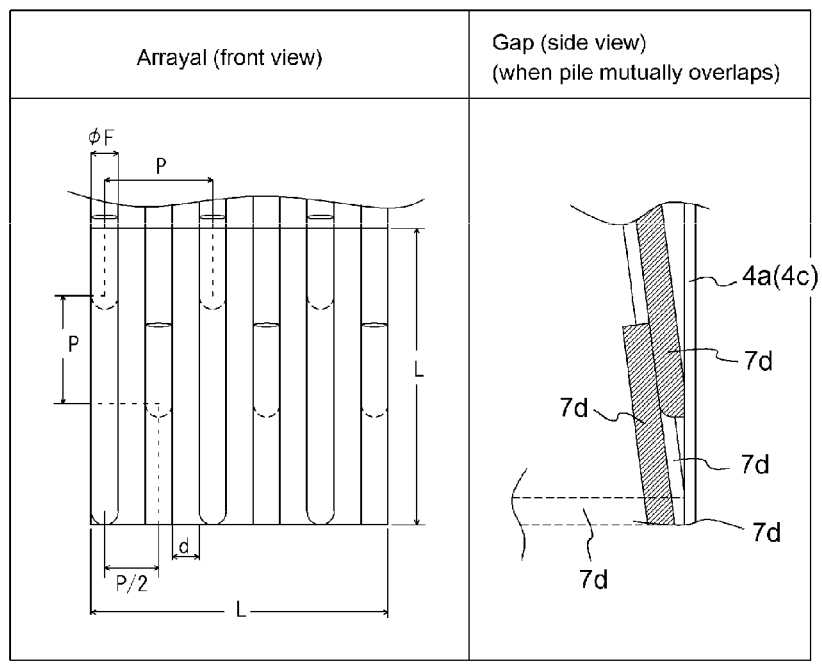

[FIG. 10]
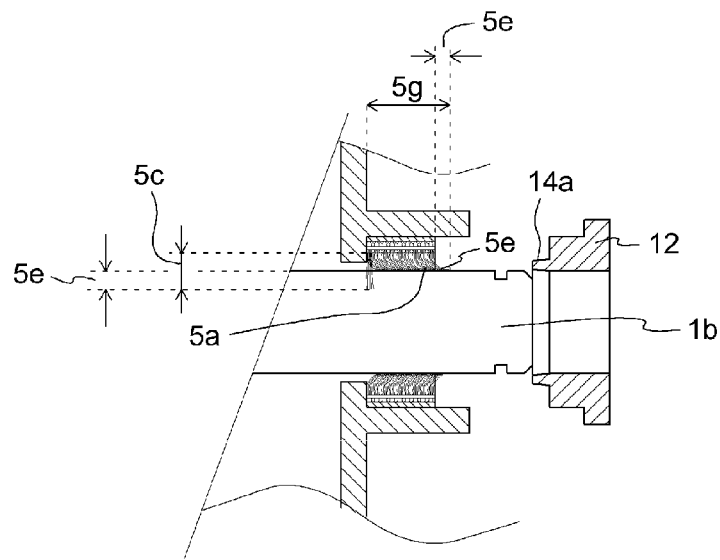
[FIG. 11]
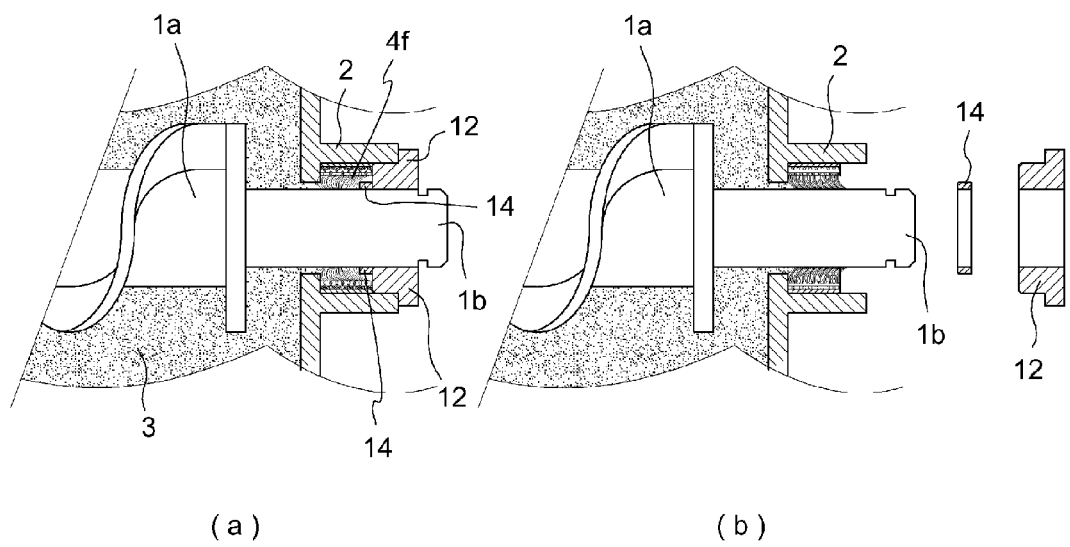
(a)          (b)

[FIG. 12]
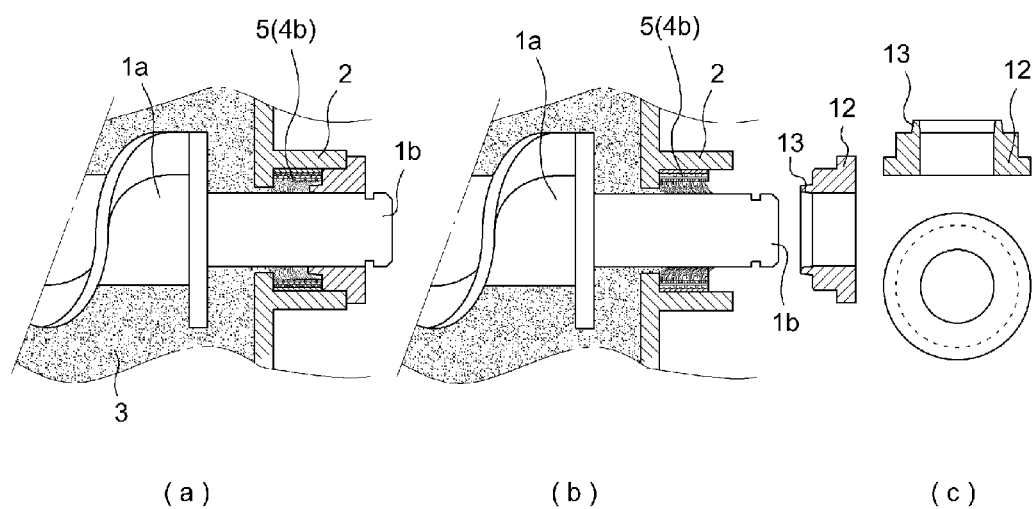
(a)　　　　　　　　(b)　　　　　　　　(c)

[FIG. 13]
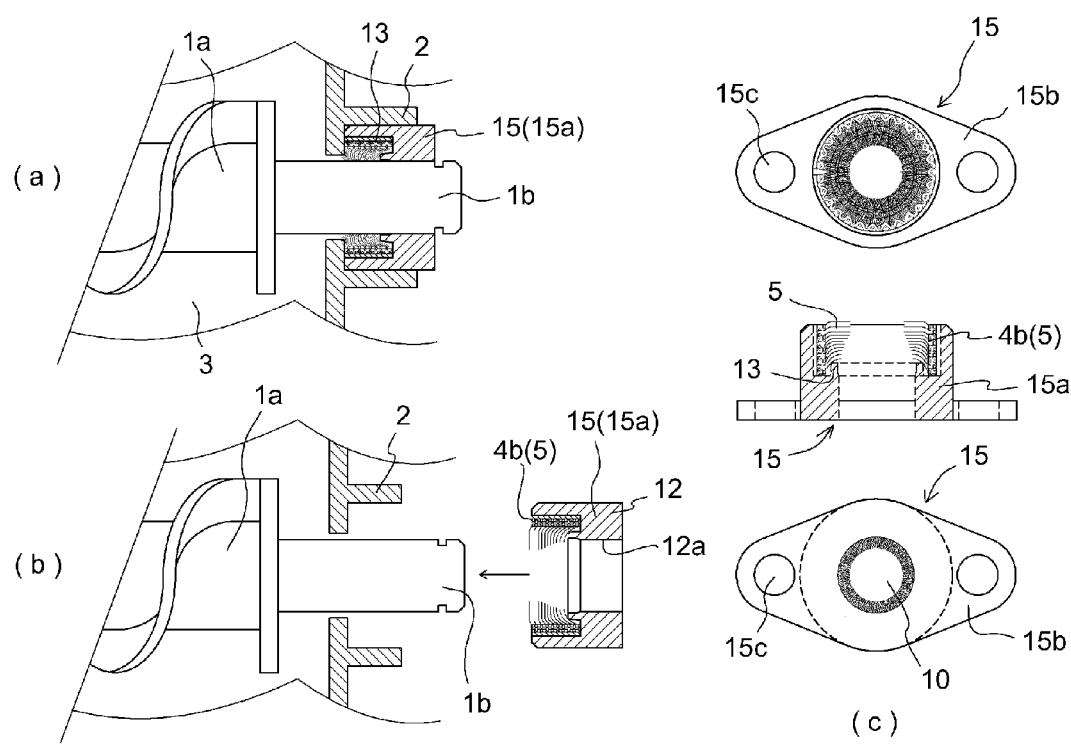

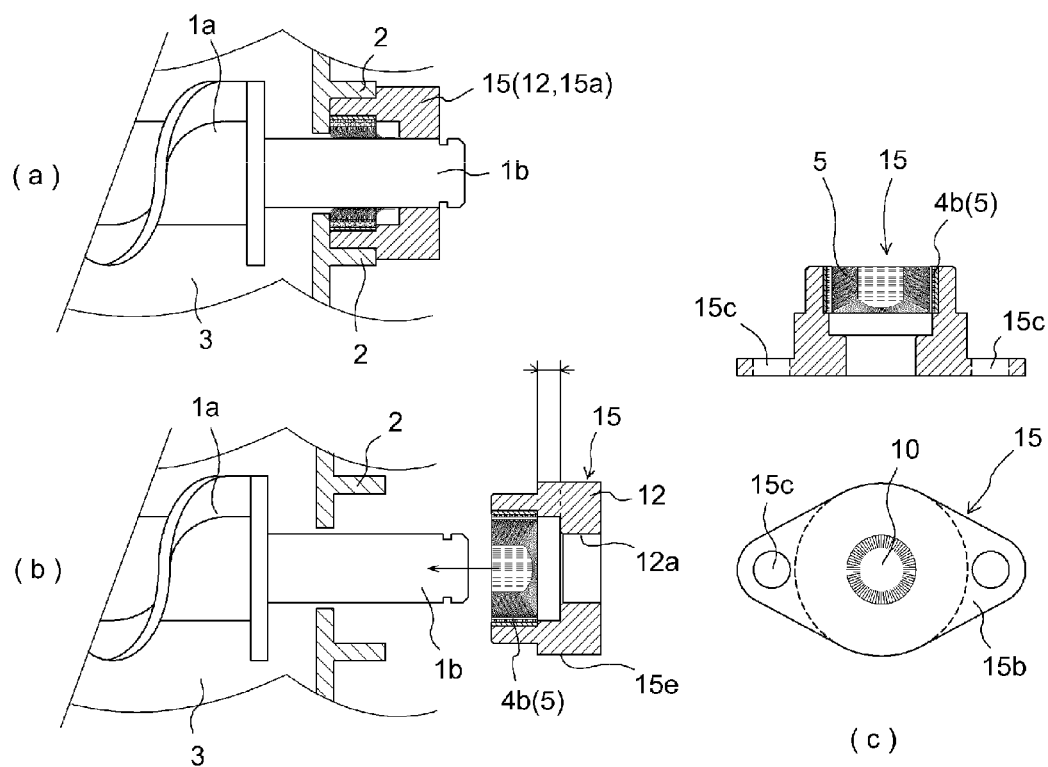
[FIG. 14]

[FIG. 15]
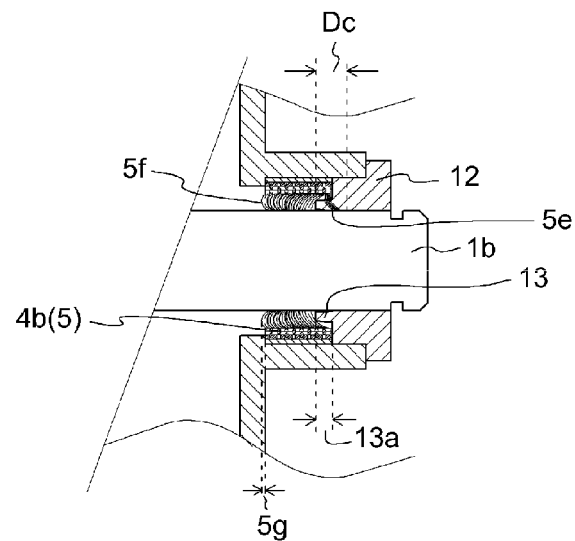
[FIG. 16]
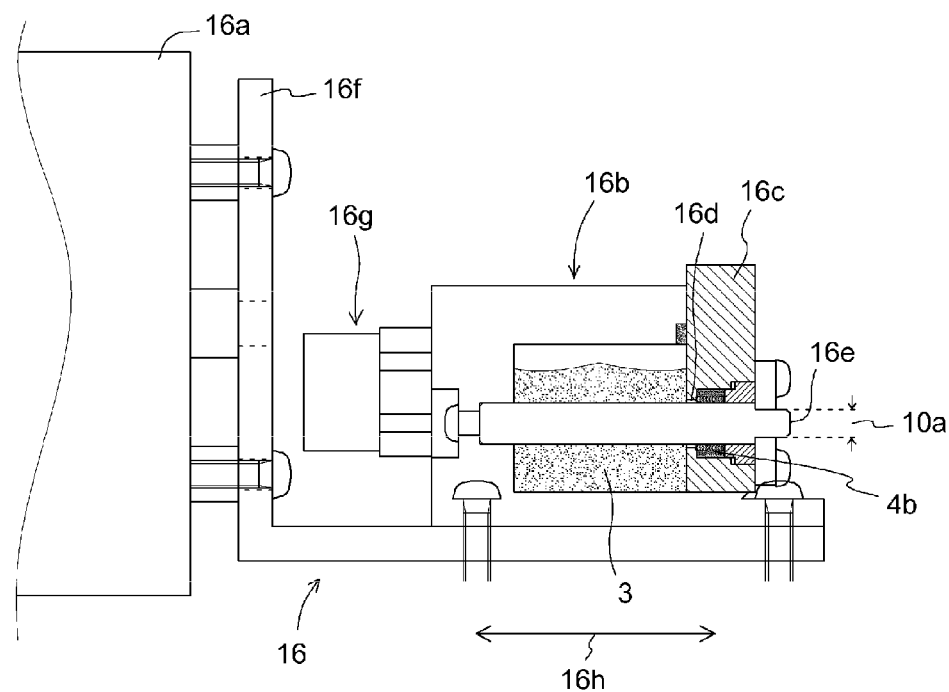

[FIG. 17]
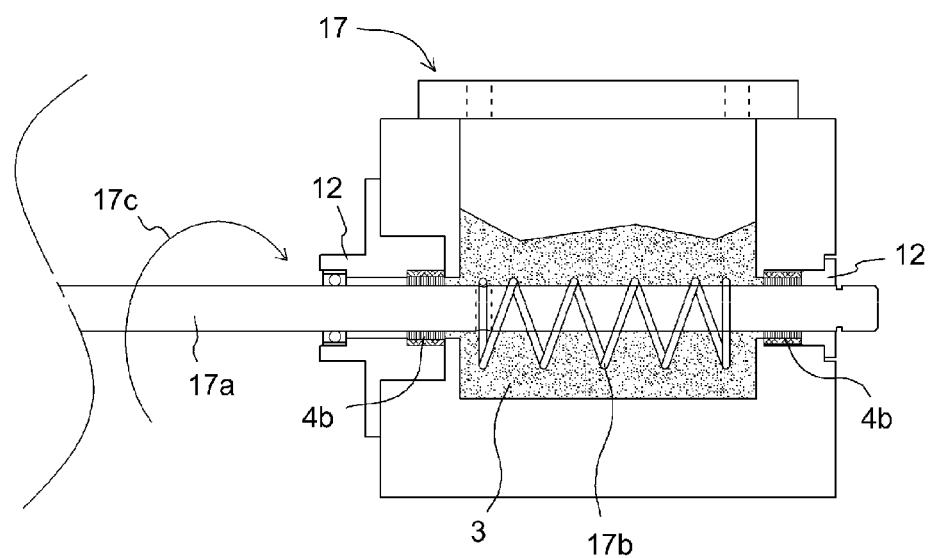

[FIG. 18]
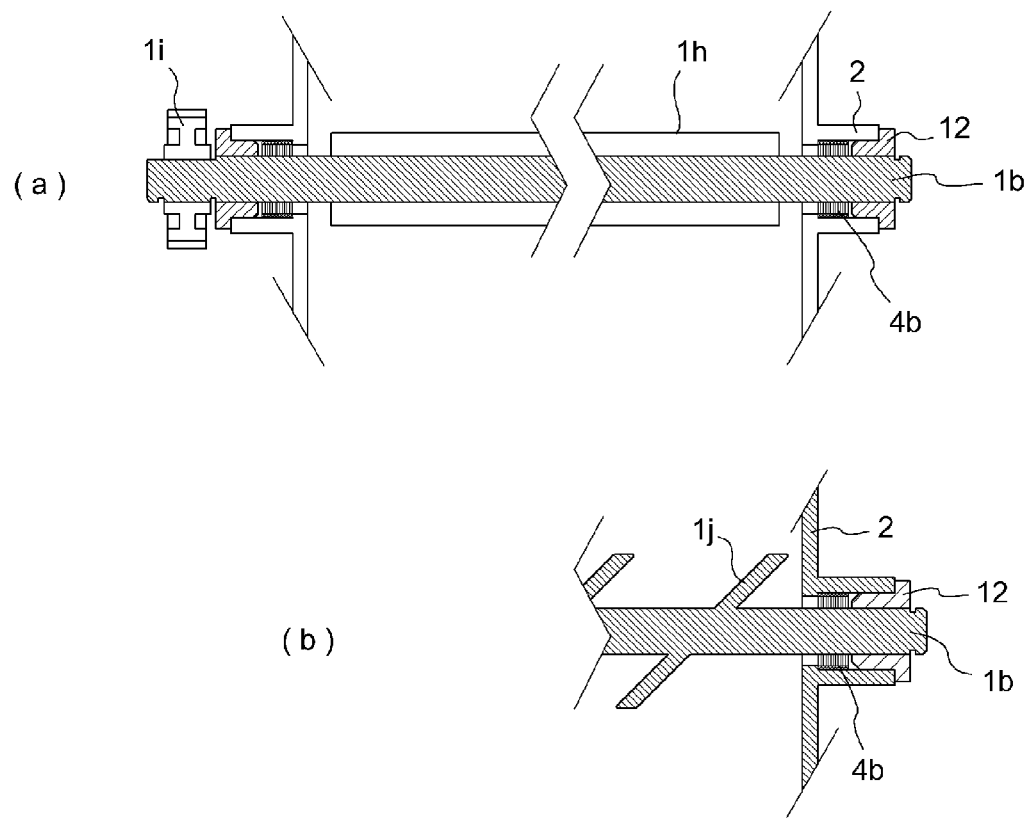

[FIG. 19]
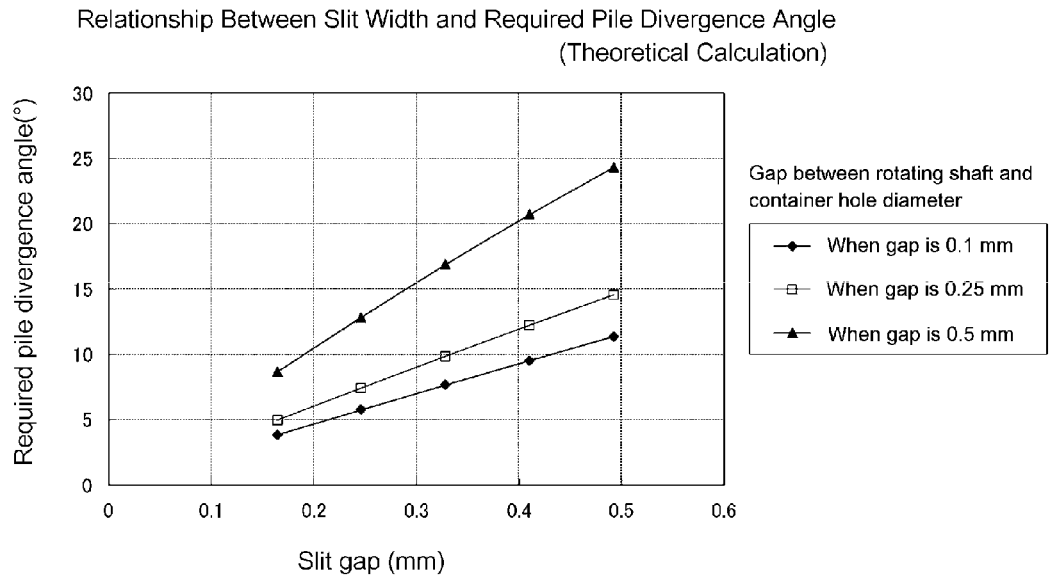
[FIG. 20]
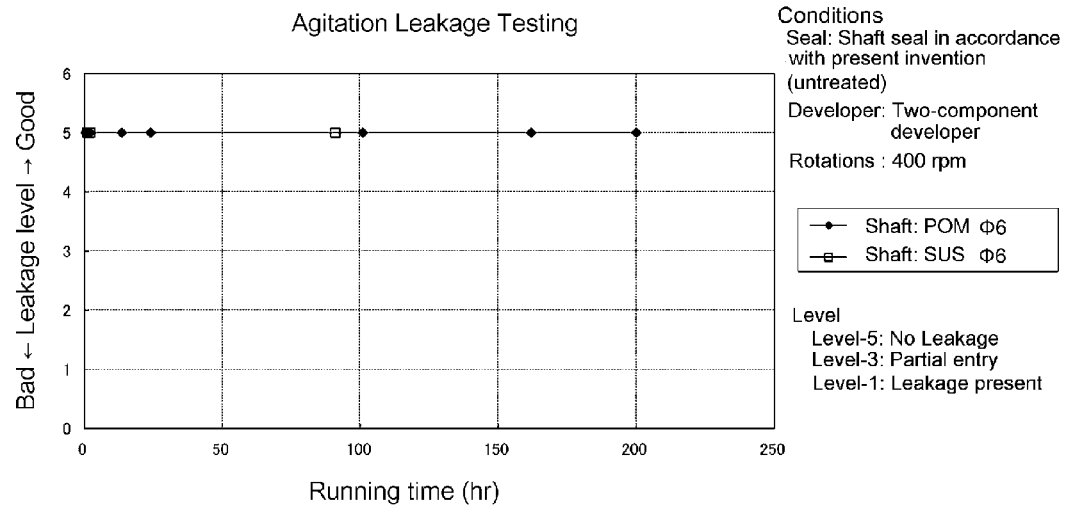

[FIG. 21]
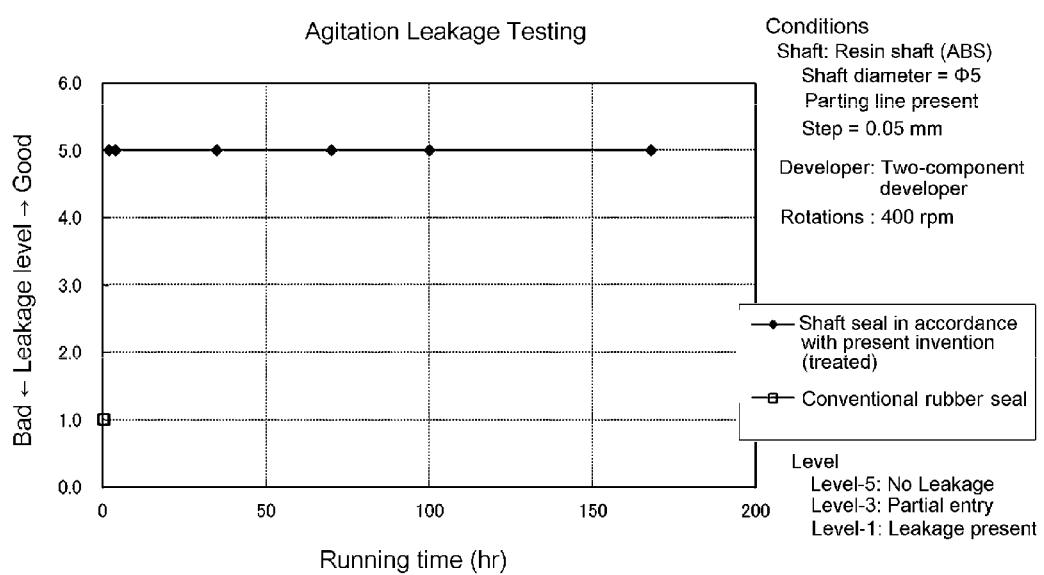

CYLINDRICAL SHAFT-SEALING MATERIAL OBTAINED FROM PILE WEAVE OR KNIT

TECHNICAL FIELD

This invention relates to a cylindrical shaft seal member comprising woven pile fabric and/or knit pile fabric (woven pile fabric and/or knit pile fabric is hereinafter referred to as "woven/knit pile fabric") having cut pile formed at an inside of a cylindrical support member that seals an end of a rotating shaft which is a rotating body in a device that handles powder, and in particular relates to a cylindrical shaft seal member in which springback causes there to be no occurrence of leakage of powder from an end of a cylindrical shaft.

BACKGROUND ART

Rubber sealing members, sponge sealing members, and felt sealing members have conventionally been employed as sealing members to seal ends of rotating shafts which are rotating bodies in devices that handle powder. Of these sealing members, rubber sealing members, being viscoelastic, have high coefficients of friction. For this reason, rubber sealing members have produced heat at high rotational speeds, abrasion has caused decrease in seal performance, and there have been problems in terms of longevity. Moreover, in accompaniment to production of heat due to friction, where the powder which is the material being sealed is a powder comprising resin as is the case with the toner in an electrophotographic apparatus, there has been the problem that the heat due to friction has caused the powder to soften and to adhere to the rotating shaft, causing the rotating apparatus of the electrophotographic apparatus to lock up. Furthermore, at seals comprising contact produced by sealing member surfaces, increase in torque has caused problems in terms of longevity of the rotating apparatus.

On the other hand, with sponge sealing members, because the sealing members have voids, it is common practice to use these while they are in a compressed state. However, because the sealing members have voids, powder which has entered the interior of the sealing member causes decrease in seal performance, and as is the case with rubber sealing members, there has been the problem that at high rotational speeds the heat due to friction causes the powdered resin which is the material being sealed to soften and to adhere to the rotating shaft, causing the rotating apparatus to lock up.

Moreover, with felt sealing members, because these employ felt which has been manufactured through compression of fibers, and because directionality of the fibers is irregular, it has been the case that once powder begins to enter the spaces between fibers within the sealing member, control of powder becomes impossible, and there has been occurrence of decrease in seal performance.

For these reasons, characteristics sought in a sealing member for powder in an apparatus or the like that handles powder include satisfactory seal characteristics, low force of friction, long life, low cost, and so forth.

There is therefore a sealing member for powder comprising woven pile fabric in which pile is napped from the surface of the base fabric, the fibers of the cut pile obtained as a result of cutting in such fashion as to cause the tips of the pile of this woven fabric to be at a uniform level being groomed so as to be in the rotational direction of the rotating body; and in addition, the spaces present at the base of this pile are blocked by crimped fibers which are included within this pile, reducing the spaces, as a result of which entry thereinto by powder is prevented (see, for example, Patent Reference No. 1).

Furthermore, a sealing member comprising sponge and felt has been proposed in which felt is arranged at the surface of a sponge or other such foam substrate, sealing being carried out by causing the surface of the felt to come in contact with the outer circumferential surface of a rotating body, or yarn comprising hollow fiber or porous hollow fiber is used as pile yarn to constitute a sealing member for a rotating body (see, for example, Patent Reference No. 2).

But because these sealing members are fundamentally planar sealing members, they must be bent in circular fashion if they are to be used at the rotating shaft of a rotating body. For this reason, because automatic insertion has been difficult, and a manual operation has been required, mechanization has been difficult to achieve.

The inventors of the present invention have therefore developed, in the context of a cylindrical seal member for preventing leakage of powder which may be employed as a shaft seal at a rotating shaft of a powder processor roller or the like which carries out processing using powder, a cylindrical seal member which, as a result of the fact that the diameter of the cylindrical seal member, which has a slit, shrinks in correspondence to the diameter of a hole for attachment of the cylindrical seal member so as to permit attachment thereto, makes it possible during installation for the diameter to shrink and after attachment for springback of the slit to cause enlargement, the fact that the central hole diameter formed by pile or fiber at the cylindrical seal member is capable of easily being enlarged to accommodate the diameter of the rotating shaft at the rotating body facilitating engagement with the rotating shaft, and also making automatic insertion during installation of the cylindrical seal member possible, and the fact that the cylindrical seal member is such that the outside diameter of the cylindrical seal member is capable of shrinkage as a result of the force of pressure acting on the outside circumference from the attachment hole making it possible to definitively stop leakage of powder from the rotating shaft (see, for example, Patent Reference No. 3).

However, as this cylindrical seal member is such that the slit which produces the springback is an inclined slit or a zigzag-shaped slit, because the tip of the cut portion produced by cutting in inclined or a zigzag fashion during manufacturing forms an acute angle, there are concerns with respect to safety during handling by workers. Furthermore, because the cylindrical seal member is such that the shape thereof is not rectangular, punching must be carried out in an operation that takes place prior to when this is made to assume a cylindrical shape during fabrication, and so there have been problems in that there is loss of material as a result of punching and in that manufacturing time cannot be shortened.

PRIOR ART REFERENCES

Patent References

PATENT REFERENCE NO. 1: Japanese Patent Application Publication Kokai No. 2005-201427
PATENT REFERENCE NO. 2: Japanese Patent Application Publication Kokai No. 2003-56713
PATENT REFERENCE NO. 3: Japanese Patent Application Publication Kokai No. 2008-26728

SUMMARY OF INVENTION

Problem to be Solved by Invention

A problem to be solved by the present invention is to solve the foregoing problems possessed by the sealing members of the prior art, and to provide a rotational shaft seal member which does not cause leakage of powder and which has a slit capable of enlargement as a result of springback.

Means for Solving Problem

Of the means in accordance with the present invention for solving the foregoing problems, a first means is a cylindrical shaft seal member that prevents leakage of powder from a rotating shaft at a rotating body in a rotating apparatus in an apparatus that handles powder, this cylindrical shaft seal member being formed from woven/knit fabric, formed at which there is pile comprising filaments, i.e., fibers, and a cylindrical support member which supports this woven/knit fabric at which the pile is formed. This cylindrical support member comprises member(s) having structure such as will permit shrinkage of an outside diameter thereof as a result of external pressure from an outside circumference, and is formed from member(s) having structure such as will permit enlargement of an outside diameter as a result of pressure acting on an inside diameter comprising pile at the cylindrical shaft seal member from a rotating shaft. Moreover, the pile is constituted from woven pile fabric and/or knit pile fabric, i.e., woven/knit pile fabric, in which there is cut pile formed at an inside of the cylindrical support member. Moreover, a slit being present which is such that when this cylindrical shaft seal member is inserted in an attachment hole at a support frame of the rotating body at the rotating apparatus, whereas prior to insertion therein an outside diameter of the cylindrical shaft seal member was identical to that of the attachment hole or was slightly larger than that of the attachment hole, upon being inserted therein the outside diameter of the cylindrical shaft seal member is able to shrink, attachment proceeding with shrinkage of the outside diameter as a result of causing this to be press-fit within the attachment hole while it is subjected to pressure from the exterior that acts thereon from the attachment hole due to elasticity. Moreover, the constitution is such that, following attachment, springback of the slit causes widening of the outside diameter so as to produce intimate contact with the inside diameter of the attachment hole. Moreover, entry of powder into the more or less linear slit formed at the outside circumference of the cylindrical shaft seal member is prevented by carrying out the following. That is, it is a cylindrical shaft seal member characterized in that a constitution is adopted in which a radius of a hole through which the rotating shaft provided at a powder container passes is larger than a radius of the rotating shaft which is a distance from a center of the cylindrical shaft seal member to a location where there is mutual overlap of pile from edges of the slit, and in which the radius of the hole through which the rotating shaft provided at the powder container passes is smaller than the distance from the center of the cylindrical shaft seal member to the location where there is mutual overlap of pile from edges of the slit, as a result of which density of the pile (i.e., of the fibers) and constitution of the pile are such that a pile pusher pushes back bulge or collapse of the pile along the direction of the rotating shaft, and the pile pushed back toward the interior along the direction of the shaft at the cylindrical shaft seal member comes in contact with a wall in a region peripheral to the hole through which the shaft of the container passes, preventing leakage of powder from the location at which the cylindrical shaft seal member is attached, and preventing leakage of powder from the rotating shaft, the slit, and the outside circumference of the cylindrical shaft seal member.

In accordance with a second means, the cylindrical shaft seal member which prevents leakage of powder is such that density of the pile (i.e., of the fibers) and/or constitution of the pile and means that pushes back bulge or collapse of the pile along the direction of the rotating shaft and/or bulge or collapse of the pile along the direction of the rotating shaft due to the attachment of the rotating shaft thereto are used to produce a constitution in which the pile toward the interior in the direction of the shaft at the cylindrical shaft seal member comes in contact with a wall in a region peripheral to the hole through which the shaft of the powder container passes, and the hole through which the rotating shaft provided at the powder container passes has a diameter which is smaller than a circle comprising a ground yarn at the cylindrical shaft seal member or having a diameter which is smaller than the distance to the location where there is mutual overlap of pile from edges of the slit in the cylindrical shaft seal member. In addition, the pile constitution comprises a pile constitution chosen from among pile in which straight fibers have been made to spread out, pile in which straight fibers have been made to be inclined, and pile in which there are crimped fibers; and/or the constitution is such that the pile is pressed on by pile pushback means such that the means for pushing back pile that is bulging or pile that is collapsed toward the exterior along the direction of the rotating shaft is a pile pushback means which is a means chosen from among a bearing which supports the rotating shaft, a cylindrical projection which is formed at the bearing, or a spacer which is provided between the cylindrical shaft seal member and the bearing. Moreover, it is a cylindrical shaft seal member according to the first means characterized in that the portion corresponding to this collapsed pile and/or the portion corresponding to this bulging pile produces contact with the wall in the region peripheral to the hole through which the rotating shaft provided at the powder container passes, preventing leakage of powder from the cylindrical shaft seal member.

In accordance with a third means, the cylindrical support member that supports cut pile comprising woven/knit pile fabric at the cylindrical shaft seal member which prevents leakage of powder comprises a planar support member chosen from among a rubber member having elasticity, a resin member, and a metal member; and the planar cut pile possessed by this planar support member is formed into the cylindrical shaft seal member as a result of being wound about such that there is mutual abutment in cylindrical fashion or is formed into the cylindrical shaft seal member through use of a mold. In accordance with such means, it is a cylindrical shaft seal member according to the first means characterized in that the cylindrical support member is provided with a slit in the direction of rotation.

In accordance with a fourth means, the cut pile comprising woven/knit pile fabric at the cylindrical shaft seal member is made up of natural fibers or synthetic fibers. In addition, the number N of fibers per unit area indicating the density of the pile (i.e., fibers) comprising filaments, i.e., fibers, per unit area for preventing leakage of powder at the woven/knit pile fabric is constituted so as to be within the range of the formula indicated at Formula (1), below. It is a cylindrical shaft seal member according to any one of the first through third means characterized in that, at this Formula (1), taking length of the fibers within that pile to be l, and taking overlap of the pile at the rotating shaft to be δ, overlap δ satisfies the relationship indicated at Formula (2), below; a pushback distance due to the pushback means is such that, when the cylindrical shaft seal member is inserted on the rotating shaft, the pile which is bulging or the pile which is collapsed toward the exterior is pushed back toward the interior along the rotating shaft direction from a location at the tip of the pile by the spacer or the bearing of the pushback means; and the distance that the pile is pushed back by this pushback means, or that the pile is depressed by this pushback means, is not less than the distance indicated at Formula (5), below, and is within a range that is ½ of the width of the seal member.
Here, $$[L/\{2\times(2\Phi_t+\Phi_F)\}]^2 < N \leq [L/(2\times\Phi_F)]^2 \quad (1)$$

$$\delta > l-[l\times\{(\Phi_F+2\Phi_t)/P\}] \quad (2)$$

At Formula (2), note that the relationship:

$$P=L/(N)^{1/2} \quad (3)$$

is satisfied, and when $$\text{porosity (\%) within pile} = \left[\frac{\{(P/2)-\Phi_F\}}{(P/2)}\right]\times 100 \quad (4)$$

$$\text{pushback distance (mm)} \geq \quad (5)$$
cylindrical shaft seal member width × (pile porosity/100)

Moreover, pushback distance is the distance by which the pile is pushed back toward the interior from the side end of the width of the cylindrical shaft seal member.

At Formula (1), note that L is unit length at one side of the square constituting unit area, $\Phi_F$ is average pile (fiber) diameter of cut pile or average diameter of pile (fiber) used at the woven/knit pile fabric, $\Phi_t$ is powder particle diameter, and P is average pitch between pile strands (fibers) in the cut pile.

In accordance with a fifth means, the cylindrical shaft seal member and the bearing are formed in such fashion that the cylindrical shaft seal member and the bearing which supports the rotating shaft and is a member which slides along the rotating shaft are constituted in integral fashion; the shaft seal member and the bearing portion that are constituted in integral fashion being such that structure is such that a space is provided for preventing pile from coming in contact with the bearing portion as a result of bulging or collapse of the pile; or such that a cylindrical projection is provided at an inside diameter different from the sliding portion of the bearing at an inside surface of this bearing, this cylindrical projection being constituted in integral fashion with respect to the cylindrical shaft seal member. In addition, it is a rotating shaft seal unit employing a cylindrical shaft seal member according to any one of the first through fourth means characterized in that the cylindrical shaft seal member and the bearing are formed in such fashion that this cylindrical projection causes the fibers of the pile to be directed in the direction of the bulge or in the direction of the collapse that is toward the interior which is in the direction of the rotating shaft.

Benefit of Invention

As a result of adoption of the foregoing means, the present invention is such that a cylindrical shaft seal member comprising woven/knit pile fabric having cut pile formed at an inside of a cylindrical support member that seals an end of a rotating shaft which is a rotating body in a device that handles powder does not experience leakage of powder despite presence of a slit capable of enlargement as a result of springback.

That is, in accordance with the first means, leakage of powder from the location at which the cylindrical shaft seal member is attached is prevented, the cylindrical shaft seal member being such that leakage of powder from the rotating shaft, the slit, and the outside circumference thereof is prevented.

In accordance with the second means, the pile constitution comprises a pile constitution chosen from among pile in which straight fibers have been made to spread out, pile in which straight fibers have been made to be inclined, and pile in which there are crimped fibers; or pile that has collapsed toward the exterior along the direction of the rotating shaft is pressed on by pile pushback means comprising a bearing which supports the rotating shaft, a cylindrical projection which is formed at the bearing, or a spacer which is provided between the cylindrical shaft seal member and the bearing; and collapse of the pile and/or bulging of the pile produces contact with the wall in the region peripheral to the hole for the rotating shaft at the powder container, preventing leakage of powder from the cylindrical shaft seal member.

In accordance with the third means, because the cylindrical support member that supports, at the outside circumference thereof, cut pile comprising woven/knit pile fabric is molded using a mold, or is a cylindrical shaft seal member formed as a result of winding, so as to cause mutual abutment in cylindrical fashion, a planar support member comprising a rubber member having elasticity, a resin member, or a metal member, and because this cylindrical shaft seal member is provided with a slit in the direction of rotation, springback from this slit makes it possible to easily attach the cylindrical shaft seal member to the attachment hole comprising a hole diameter at the support frame.

In accordance with the fourth means, cut pile is formed that comprises woven/knit pile fabric at the cylindrical shaft seal member made up of natural fibers or synthetic fibers; the number of fibers per unit area, i.e., the density of the fibers of this pile is constituted so as to be within the range of Formula (1); a distance by which pile that has bulged or has collapsed toward the exterior is pushed back toward the interior by pushback means at cylindrical shaft seal member inserted on a rotating shaft employing pushback means is not less than that at Formula (5), and is ½ of the seal width, as a result of which it is possible to definitively prevent leakage of powder from the fiber of the pile.

In accordance with a fifth means, because the cylindrical shaft seal member and the bearing are formed in such fashion that the cylindrical shaft seal member and the bearing which supports the rotating shaft and is a member which slides along the rotating shaft are constituted in integral fashion; the bearing portion and the shaft seal member that are constituted in integral fashion being such that structure is such that a space is provided for preventing pile from coming in contact with the bearing portion as a result of bulging or collapse of the pile; or structure being such that a cylindrical projection is provided which is different from the sliding portion of the bearing at an inside surface of this bearing, this cylindrical projection being constituted in integral fashion with respect to the cylindrical shaft seal member, deformation due to bulging or collapse of the pile or this cylindrical projection causing the fibers of the pile to bulge or collapse so as to be directed toward the interior along the direction of the rotating shaft, it is possible to eliminate entrainment of pile by the rotating shaft. Moreover, because the cylindrical shaft seal member is constituted in integral fashion with respect to the bearing to constitute a rotating shaft seal unit, it is possible in the event of failure to carry out replacement of the cylindrical shaft seal member by replacing the rotating shaft seal unit, so that replacement is accomplished not by replacing the entire apparatus but by replacing the component unit, there is reduced waste, resources are conserved, and there is improved efficiency during maintenance operations.

BRIEF DESCRIPTION OF DRAWINGS

FIG. 1 Drawing showing the constitution of pile at a planar seal member.

FIG. 2 (a) to (c) Diagrams showing the basic constitution of a cylindrical shaft seal member; (a) being a front view; (b) being a side view as seen from the left in the drawing at (a); and (c) being a sectional view of (b).

FIG. 3 (a) to (c) Diagrams showing the situation that exists when the condition for preventing leakage of powder is $\Phi B/2 < Dp$; (a) being a diagram in which a bearing serving as pushback means is installed on a rotating shaft; (b) being a diagram showing the situation that exists when the bearing serving as pushback means is removed from (a); and (c) being a diagram showing (b) as seen from the right in the drawing.

FIG. 4 Enlarged view of (a) at FIG. 3.

FIG. 5 Enlarged view of (c) at FIG. 3.

FIG. 6 (a) to (c) Diagrams showing the situation that exists when the condition for preventing leakage of powder is $\Phi B/2 > Dp$; (a) being a diagram in which a bearing serving as pushback means is installed on a rotating shaft; (b) being a diagram showing the situation that exists when the bearing serving as pushback means is removed from (a) and powder leaks from the gap; and (c) being a diagram showing (b) as seen from the right in the drawing and in which the gap of the slit width is formed as far as the location at which pile overlaps.

FIG. 7(a) to (c) Diagrams showing collapse of pile following attachment as a result of insertion of the cylindrical shaft seal member on the rotating shaft and bulging of pile when pile is pushed back by a bearing serving as pushback means.

FIG. 8(a) to (c) Diagrams showing examples of insertion at a rotating shaft following attachment of a cylindrical shaft seal member, and attachment such that pile is collapsed toward the interior.

FIG. 9(a) to (b) Conceptual models showing pile arrayal and pile gap; (a) at left showing a diagram of a conceptual model of pile arrayal as seen from the top, at center showing a diagram of a conceptual model of pile arrayal as seen from the side, and at right showing a diagram of a conceptual model at a time of maximum deflection as seen from the side; and (b) at left showing a diagram of a conceptual model of pile gap as seen from the front, and at center showing a diagram of a conceptual model of pile gap in a situation where there is mutual overlap of pile as seen from the side.

FIG. 10 Drawing showing pile overlap and range over which pile is pressed.

FIG. 11(a) to (b) Diagrams of provision of bearing and spacer between bearing and cylindrical shaft seal member.

FIG. 12 (a) to (c) Diagrams showing the situation that exists when pile is pushed back by means of a cylindrical projection by a cylindrical shaft seal member.

FIG. 13 (a) to (c) Diagrams showing attachment of a rotating shaft seal unit for a rotating shaft which is formed such that a cylindrical shaft seal member and a bearing are constituted in integral fashion.

FIG. 14 (a) to (c) Diagrams showing attachment of a rotating shaft seal unit for a rotating shaft of different configuration which is formed such that a cylindrical shaft seal member and a bearing are constituted in integral fashion.

FIG. 15 Drawing showing locations for measurement of the amount of bulge of pile carried out by varying height of a projection serving as pressing means when pile is collapsed toward the exterior along the direction of a rotating shaft.

FIG. 16 Schematic diagram of vibration testing machine.

FIG. 17 Schematic diagram of agitation testing machine.

FIG. 18(a) to (b) Diagrams showing examples of use of a cylindrical shaft seal member; (a) being a diagram showing an example of use thereof at a supply roller shaft; and (b) a diagram showing an example of use thereof at an agitating roller shaft.

FIG. 19 Graph showing theoretical calculation of relationship between rotating shaft and gap at hole at container, and of relationship between slit width and required divergence angle at pile yarn comprising woven/knit pile fabric which is a seal member.

FIG. 20 Graph showing relationship between running time and level of leakage during agitation leakage testing of powder at cylindrical shaft seal members and a shaft made of resin and a shaft made of stainless steel.

FIG. 21 Graph showing relationship between running time and level of leakage during agitation leakage testing of powder at a cylindrical shaft seal member in accordance with the present invention and a conventional seal made of rubber employed at rotating shafts having parting lines produced as a result of molding by means of a metal mold.

EMBODIMENTS FOR CARRYING OUT INVENTION

Below, embodiments of the present invention are described with reference to the drawings and the tables. An invention in accordance with a first means occurs in the context of a cylindrical shaft seal member 4b which prevents leakage of powder 3 from a rotating shaft 1b of a rotating body 1a constituting a rotating apparatus installed at an apparatus 1 that handles powder 3; e.g., powder container 9. In addition, formed at this cylindrical shaft seal member 4b is a cylindrical support member 4c in which a woven/knit pile fabric 7 having pile 5 comprising fibers is of cylindrical shape and is such that tips of pile 5 are directed toward the center 4i. Furthermore, this cylindrical support member 4c comprises member(s) having structure such as will permit shrinkage of outside diameter 4e of cylindrical support member 4c as a result of external pressure from the outside circumference thereof. Moreover, the inner circumferential surface at inside diameter 4d of pile 5 of this cylindrical shaft seal member 4b is formed from member(s) having structure such as, when acted on by pressure directed toward the outside circumference from rotating shaft 1b which is engaged therewith at the interior thereof, will permit enlargement of outside diameter 4e of outer ring support member 4h constituting cylindrical support member 4c.

This pile 5 comprises woven/knit pile fabric 7 having cut pile 7b which is formed at the inside of cylindrical support member 4c. Moreover, when cylindrical shaft seal member 4b is inserted in attachment hole 2a of support frame 2 at rotating body 1a constituting rotating apparatus at powder container 9, whereas prior to insertion the outside diameter 4e constituting the outside circumference of cylindrical shaft seal member 4b was identical to hole diameter 2b of attachment hole 2a or was slightly larger than hole diameter 2b of attachment hole 2a, upon being inserted therein because outside diameter 4e of cylindrical shaft seal member 4 has slit 8 permitting shrinkage, as a result of the fact that it can shrink under pressure from the exterior which acts thereon from attachment hole 2a, it is possible for attachment to be carried out such that the outside diameter 4e of cylindrical shaft seal member 4 is press-fit within attachment hole 2a. Moreover, following attachment, because springback of slit 8 causes enlargement of outside diameter 4e at tubular shaft seal member 4, it is possible for this to be attached thereto so as to be in intimate contact with attachment hole 2a. Moreover, entry of powder 3 into the more or less linear slit 8 formed at the outside diameter 4e of cylindrical shaft seal member 4b is prevented as described below. That is, by adopting a constitution in which the radius of the hole 10 through which the rotating shaft provided at powder container 9 passes, i.e., ½ of the hole diameter 2b at the attachment hole 2a, is smaller than the distance 5d from the center 1d of the cylindrical shaft seal member 4b to a location where there is mutual overlap of pile at pile 5 from edges of slit 8, but is larger than the rotating shaft radius 1c, which is the distance from the center 4i of the cylindrical shaft seal member 4b to a location where pile 5 from edges of slit 8 mutually overlap, deformation due to collapse of pile 5 in the direction of rotating shaft 1b as a result of attachment to rotating shaft 1b, means which push back the pile 5 that is collapsed in the direction of rotating shaft 1b, the density of pile 5, and the constitution of pile 5, act in combination to prevent leakage of powder 3 from location(s) at which cylindrical shaft seal member 4b is attached. By virtue of such means, the invention in accordance with the first means comprises a constitution permitting prevention of leakage of powder 3 from rotating shaft 1b, slit 8, and outside diameter 4e of cylindrical shaft seal member 4b.

An invention in accordance with a second means will next be described. This invention in accordance with a second means permits prevention of leakage of powder 3 from location(s) at which cylindrical shaft seal member 4b is attached. In accordance with this invention, the density of pile 5 (i.e., of the fibers), the constitution of pile 5, and means that pushes back collapse of pile 5 along the direction of the rotating shaft due to the attachment of rotating shaft 1b thereto and/or collapse of pile 5 along the direction of rotating shaft 1b produces a constitution in which pile 5 toward the interior along the direction of the shaft at the cylindrical shaft seal member comes in contact with wall(s) in region(s) peripheral to hole(s) through which shaft(s) pass at container(s), preventing leakage of powder 3 from location(s) at which cylindrical shaft seal member 4b is attached. This leakage prevention action is accomplished by virtue of force(s) due to reactive-force-providing elasticity from pile 5, and by virtue of the density and constitution of pile 5, being constituted such that pile 5 comes in contact with wall 10b in a region peripheral to hole 10 through which rotating shaft 1b formed at powder container 9 passes. Here, hole 10 through which the rotating shaft provided at powder container 9 passes is formed so as to have a hole diameter 10a smaller than the circle comprising ground yarn 7c at cylindrical shaft seal member 4b, or is formed so as to have a hole diameter 10a smaller than distance 5d to a location where there is mutual overlap of pile at pile 5 from edges at slit 8 in cylindrical shaft seal member 4b. Above, the constitution of pile 5—being a constitution of pile 5 chosen from among a constitution of pile 5 in which there are napped straight fibers that spread out from the vicinity of their bases to constitute a divergence angle, or pile 5 comprising straight fibers in which the fibers of pile 5 that have been made to incline in the direction of rotation or toward the interior along rotating shaft 1b, or pile 5 comprising crimped fibers—is a pile constitution in which leakage of powder 3 is prevented by overlap of pile 5 or mutual entanglement of pile 5, or is a constitution of pile 5 in which means that causes pile 5 which has collapsed so as to be directed toward the exterior along the rotating shaft direction 1f to be pushed back toward the interior therealong, being pushback means that causes pile 5 to be pressed toward the interior, is one among: pushback means comprising spacer(s) 14 provided between bearing 12 and seal member 4f, and/or pushback due to cylindrical projection 13 formed at bearing 12, or pushback means comprising bearing 12 which supports rotating shaft 1b. Moreover, contact of collapsed and/or bulging portion(s) of this pile 5 with wall 10b in the region peripheral to hole 10 through which rotating shaft 1 provided at powder container 9 passes permits prevention of leakage of powder 3 from cylindrical shaft seal member 4b. That is, at the invention in accordance with the second means, leakage of powder 3 is prevented at cylindrical shaft seal member 4b.

An invention in accordance with a third means will moreover be described. The invention in accordance with the third means occurs in the context of a cylindrical shaft seal member 4b which prevents leakage of powder 3. That is, at cylindrical shaft seal member 4b, cylindrical support member 4c, by means of which cut pile 7b comprising woven/knit pile fabric 7 is supported at the outside circumference thereof such that it assumes a cylindrical shape, is formed by causing the two ends of planar support member 11 formed from rubber member(s) having elasticity, resin member(s), or metal member(s) to mutually abut in cylindrical fashion, or is molded using a mold. This planar support member 11 might be such that cut pile 7b is formed on the surface of a base material in the form of a planar support member 11 comprising, for example, aluminum. In addition, as described above, planar support member 11 comprising aluminum and having cut pile 7b is wound so that the two ends of thereof mutually abut in cylindrical fashion, or a mold die is used to carry out molding to produce cylindrical shaft seal member 4b having cut pile 7b. As a result of such means, this cylindrical shaft seal member 4b is such that the two ends of the aforementioned planar support member 11 are wound about the direction of rotating shaft 1b, or is molded so as to be of cylindrical shape, the portions which are made to mutually abut forming a gap in the form of slit 8, so as to produce cylindrical shaft seal member 4b having slit 8.

An invention in accordance with a fourth means will moreover be described. The invention in accordance with the fourth means is a cylindrical shaft seal member 4b having cut pile 7b comprising woven/knit pile fabric 7. Woven/knit pile fabric 7 forming this cut pile 7b comprises natural fibers and/or synthetic fibers. Fiber density, i.e., the number N of fibers per unit area, at pile 5 which is capable of preventing leakage of powder 3 from such fibers is constituted so as to be within the range indicated at Formula (1), below. Within this range, the cylindrical shaft seal member 4b inserted on rotating shaft 1b is such that, taking length of fibers within pile to be I, and taking overlap of pile at the rotating shaft to be δ, overlap δ is constituted so as to cause the inequality indicated at Formula (2), below, describing the relationship between it and I to be satisfied. Furthermore, the pushback distance due to pushback means is such that when pile 5 which has collapsed toward the exterior along the rotating shaft direction 1*f* is pushed back toward the interior along the rotating shaft direction 1*f* from location(s) at tip(s) of pile 5 by pushback means, the distance pushed back by this pushback means at cylindrical shaft seal member 4*b* is not less than the distance indicated at Formula (5), below, and is within a range that is ½ of the width of seal member 4*f*.

Here, $$[L/\{2\times(2\Phi_t+\Phi_F)\}]^2 < N \leq [L/(2\times\Phi_F)]^2 \quad (1)$$

$$\delta > I - [I \times \{(\Phi_F+2\Phi_t)/P\}] \quad (2)$$

At Formula (2), note that the relationship $$P = L/(N)^{1/2} \quad (3)$$

is satisfied, and when $$\text{porosity (\%) within pile } 5 = \left[\frac{\{(P/2) - \Phi_F\}}{(P/2)}\right] \times 100 \quad (4)$$

pushback distance (mm) ≥ (5)
cylindrical shaft seal member 4*b* width × (pile 5 porosity/100)

Moreover, pushback distance is the distance by which the pile is pushed back toward the interior from the side end of the width of the cylindrical shaft seal member.

At Formula (1), note that L is unit length per unit area of the cylindrical shaft seal member, $\Phi_F$ is average pile diameter of cut pile or pile (fiber) used at the woven/knit pile fabric, $\Phi_t$ is powder particle diameter, and P is average pitch between pile strands in the cut pile.

Furthermore, an invention in accordance with a fifth means will moreover be described. The invention in accordance with the fifth means is a rotating shaft seal unit 15 employing a cylindrical shaft seal member 4*b*, being such that two components, i.e., cylindrical shaft seal member 4*b* and bearing 12 which supports and slides along rotating shaft 1*b*, are constituted in integral fashion. This bearing 12 and this cylindrical shaft seal member 4*b* are constituted in integral fashion, the structure being such that a space for preventing entrainment of pile 5 by sliding portion 12*a* as a result of collapse thereof when inserted on rotating shaft 1*b* is provided between cylindrical shaft seal member 4*b* and sliding portion 12*a* of bearing 12, or a cylindrical projection 13 different from sliding portion 12*a* of bearing 12 is provided at the inside surface of this bearing 12, this cylindrical projection 13 being constituted in integral fashion with respect to cylindrical shaft seal member 4*b*. In addition, this cylindrical projection 13 causes the fibers of pile 5 to be directed toward the interior, i.e., along the rotating shaft direction 1*f*. Rotating shaft seal unit 15 thus has a structure in which there is a space permitting prevention of entrainment between pile 5 and sliding portion 12*a* as a result of collapse of pile 5, or a structure in which bearing 12 and cylindrical shaft seal member 4*b* are arranged at holder 15*a* in a state in which the fibers of pile 5 are directed toward the interior, i.e., along the rotating shaft direction 1*f*.

As described above, a cylindrical shaft seal member 4*b* in accordance with the invention may, for example, be constituted as shown in FIG. 2 from cut pile 7*b* having napped straight fibers provided on a pile support member 4*a* that is planar and that comprises sheet aluminum as shown in FIG. 1. The constitution of cut pile 7*b* provided on planar pile support member 4*a* comprising sheet aluminum shown in FIG. 1 will now be described. Pile 5 comprising fibers of pile yarn 7*a* is supported by weft yarn 7*e* and warp yarn 7*d* constituting ground yarn 7*c* that has been made to adhere, by means of adhesive layer 7*f* produced by adhesive, to pile support member 4*a* which is planar and which comprises sheet aluminum, the tips of pile 5 comprising fibers of this pile yarn 7*a* being cut to form cut pile 7*b*. The tips of cut pile 7*b* bound to one side of weft yarn 7*e* open out so as to spread out in the shape of a fan of size corresponding to the divergence angle θ of the pile. Accordingly, cut pile 7*b* engaged with a single strand of weft yarn 7*e* at ground yarn 7*c* spreads out to the left and right in such fashion that the total divergence angle formed is 2θ. Moreover, spreading of the respective fibers at left and right in adjacent tufts of cut pile 7*b* is such that the amount of mutual overlap between tufts of the cut pile 7*b* corresponds to θ.

(a) at FIG. 2 is a front view of a cylindrical shaft seal member 4*b* having a linear slit 8 of slit width 8*a*; (b) at FIG. 2 is a side view as seen from slit 8; and (c) at FIG. 2 is a sectional view of (b). This cylindrical shaft seal member 4*b* is such that the portion thereof at the outside diameter 4*e* comprises material chosen from among formed from rubber member(s) having elasticity, resin member(s), or metal member(s); and is such that the portion thereof extending to the inside diameter 4*d* comprises a seal member 4*f* comprising woven/knit pile fabric 7. This material at the portion at the outside diameter 4*e* and this seal member 4*f* at the portion extending to the inside diameter 4*d* are constituted in integral fashion to form cylindrical shaft seal member 4*b*. The constituting in integral fashion of this material at the portion at the outside diameter 4*e* and this seal member 4*f* which is the portion extending to the inside diameter 4*d* may be accomplished by constituting these in integral fashion through use of adhesive, or these may be formed in integral fashion through resin molding. Note that where constituting in integral fashion is accomplished through use of adhesive it will be necessary to keep regions (i.e., the regions toward inside diameter 4*d*) other than the bases of napped pile 5 (the portions of ground yarn 4*g* which are toward outside diameter 4*e*) from becoming impregnated with adhesive; and where constituting in integral fashion is accomplished through resin molding it will be important during molding to keep regions other than the bases of pile 5 from becoming impregnated with resin. Furthermore, this cylindrical shaft seal member 4*b* has a more or less linear slit 8 at outer ring support member 4*i* at the outside circumference. A structure is thus formed in which springback at seal member 4*f* makes it possible for cylindrical shaft seal member 4*b* to be easily attached to attachment hole 2*a* comprising hole diameter 2*b* at support frame 2. This being the case, to prevent leakage of powder 3 from the region at slit 8 formed in cylindrical shaft seal member 4*b*, there is a region in the circumferential direction of slit 8 at which fibers of pile 5 mutually overlap, and the location at which overlap occurs in this overlapping region is larger than the radius of rotating shaft 1*b*. For this reason, it is necessary in the region not constrained by ground yarn 7*c* constituting woven/knit pile fabric 7 that cut pile 7*b* comprising pile yarn 7*a* at woven/knit pile fabric 7 spread out sufficiently in similar fashion as at FIG. 1.

The method of spreading woven/knit pile fabric 7 employed in the present invention may be a method in which spreading is accomplished by washing or may be a method in which spreading is accomplished by causing swelling of pile yarn 7*a* through use of damp hot air, or may be a method in which spreading of a pile yarn 7*a* is accomplished by causing swelling of pile yarn 7*a* and thereafter inserting needle-like object(s) between the fibers of the swollen pile yarn 7a. As a result of such spreading method(s), it is possible to obtain a state in which pile 5 continues to be spread out in the region not constrained by ground yarn 7c. The pile may therefore be made to spread out so as to form a divergence angle θ which is not less than 5 degrees; and in addition, the region at which there mutual overlapping of respective tufts of pile 5 may be made to extend as far as the vicinity of the base 5a of the pile 5. Note that upon measurement of the divergence angle θ of pile 5 at planar seal member 4 shown in FIG. 1 it was confirmed that this was 10 degrees to 15 degrees. These may be such that the distance 5d from the center 4i of the cylindrical shaft seal member 4b shown in FIG. 2 to a location where there is mutual overlap of pile 5 is larger than the applicable radius of the rotating shaft 1b (shown in FIG. 3), and such as to prevent existence at rotating shaft 1b of a gap at slit 8 that would permit leakage of powder 3. Furthermore, although not shown in the drawings, if crimped fibers are used, the crimp of the fibers will facilitate spreading of the angle, causing fibers constituting pile 5 to become splayed out where these have been cut at their ends, permitting formation of a bulging state, and even where inclined fibers are employed, it will be possible to cause distance 5d to be made larger than the applicable radius of the rotating shaft 1b (shown in FIG. 3).

As can be seen at FIG. 3, FIG. 4, and FIG. 5—particularly (b) at FIG. 3—tip portions of pile 5 are collapsed so as to be directed toward the exterior of rotating shaft 1b attached to powder container 9 through which rotating shaft 1b passes and cylindrical shaft seal member 4b constituted as described above. However, as a result of the fact that tip portions of pile 5 are pushed back toward the interior of rotating shaft 1b by bearing 12, which is one means for pushing back this collapsed pile 5, bearing 12 which is a means for pushing back pile 5 causes pile 5 to bulge at wall 10b in the region peripheral to the hole 10 through which the rotating shaft provided at powder container 9 which is a rotating body 1a passes. This bulge causes pile 5 to come in contact with wall 10b in the region peripheral to the hole 10 through which the rotating shaft provided at powder container 9 passes, preventing leakage of powder 3, this situation being shown at FIGS. 2, 3, and 4. It being a condition for preventing leakage at this time that the diameter 10a of the hole 10 through which the rotating shaft provided at powder container 9 passes should be a hole diameter which is smaller than that of a hole formed so as to have a diameter which is the distance 5d to the location at which there is mutual overlap of pile 5, it is clear that leakage of powder 3 from pile 5 is prevented by seal member 4f.

The situation that exists when the radius of hole diameter 10a at the hole through which the rotating shaft at powder container 9 which is a rotating body 1a passes is greater than the distance 5d to the location at which there is mutual overlap of pile 5 is shown at FIG. 6. As can be seen at (c) in FIG. 6, if distance 5d to the location at which there is mutual overlap of pile 5 is made to be closer to the center 1d of rotating shaft 1b than the radius of hole diameter 10a of the hole through which the rotating shaft provided at powder container 9 passes, i.e., if distance Dp (5d) from the center of the hole through which the rotating shaft passes to the location at which there is mutual overlap of pile is made smaller, then a gap 8c will be produced at slit width 8a, blockage by pile 5 will no longer be achieved, and leakage of powder 3 will occur. Accordingly, at cylindrical shaft seal member 4b having linear slit 8, the hole 10 through which the rotating shaft at powder container 9 attached to seal member 4f passes and the wall 10b at the region peripheral to this hole 10 are important factors, it being desirable to make the diameter 10a of the hole through which the rotating shaft passes as small as possible; and in terms of the relationship with rotating shaft 1b, it is desirable that the gap between rotating shaft 1b and the hole 10 through which the rotating shaft passes be not more than 1.0 mm.

FIG. 7 shows exemplary attachment of cylindrical shaft seal member 4b when rotating shaft 1b passes through powder container 9. When rotating shaft 1b passes therethrough, if seal member 4f in accordance with the present invention is attached, pile 5 will be collapsed in the direction toward the exterior of rotating shaft 1b as shown at (b) in FIG. 7. Bearing 12, which is a pushback means, causes this pile 5 that has collapsed toward the exterior to be pushed in the direction toward the interior of rotating shaft 1b as shown at (a) in FIG. 7, causing formation of a bulge in pile 5 in the direction opposite the direction in which the pile 5 had been collapsed, and the bulge in pile 5 comes in contact with the region peripheral to the hole 10 through which the rotating shaft at powder container 9 passes, preventing leakage of powder 3.

As shown at (c) in FIG. 8, an example is shown of a situation that might exist when cylindrical shaft seal member 4b in accordance with the present invention has been attached at hole 10 through which the rotating shaft passes, and rotating shaft 1b which is sealed by this cylindrical shaft seal member 4b is thereafter inserted therein. The direction in which pile 5 is collapsed at this time is such that that it is collapsed toward powder container 9, the situation being such that pile 5 enters the hole 10 through which the rotating shaft at powder container 9 passes. It is a condition for this that such collapse of pile 5 be such that collapse of pile 5 is constrained by the wall at support frame 2 in the region peripheral to the hole 10 through which the rotating shaft at powder container 9 passes.

Moreover, fiber density at pile 5 employed at cylindrical shaft seal member 4b in accordance with the present invention is a density in accordance with the relationship indicated at Formula (1), below. It is a condition describing a situation in which the fiber density at pile 5 is made such that two or more particle diameters of powder 3 are unable to enter thereinto when the pile 5 has not collapsed, which is to say that it is a condition describing a situation in which collapse of pile 5, i.e., achievement of a state in which the fibers therein have become inclined, will prevent powder 3 from entering the hole 10 through which the rotating shaft at powder container 9 passes.

$$[L/\{2\times(2\Phi_t+\Phi_F)\}]^2 < N \le [L/(2\times\Phi_F)]^2 \tag{1}$$

Here,

N is the number of fibers per unit area of pile;

L is unit length of one side of the unit area;

$\Phi_F$ is average pile diameter of cut pile or pile used at the woven/knit pile fabric;

$\Phi_t$ is powder particle diameter; and

P is average pitch between pile strands in the cut pile.

In addition, at pile 5 having the foregoing fiber density, it is a condition applicable to collapse of pile 5 that, when fibers within the pile are of length l, overlap δ of pile at the rotating shaft is such that the condition indicated at Formula (2), below, applies.

$$\delta > l - [l \times \{(\Phi_F + 2\Phi_t)/P\}] \tag{2}$$

At Formula (2), note that the relationship $$P = L/(N)^{1/2} \tag{3}$$

is satisfied.

Here,

P is average pitch between pile strands in the cut pile.

Moreover, regarding the relationship applicable to pile 5 in accordance with the present invention by which pile 5 which has collapsed in the direction toward the exterior along rotating shaft 1b is pushed back in the direction toward the interior, there is a relationship between the pushback distance and the porosity between the respective tufts of pile 5, this porosity between the respective tufts of pile 5 is indicated at Formula (4), below; the relationship indicated at Formula (5), below, applies to the pushback distance, this relationship being a relationship for calculating the minimum required amount of pushback; and (a) at FIG. 9 shows an exemplary model of arrayal of pile, the diagram at left being a view as seen from above of arrayal of pile with average pile diameter $\Phi_F$ and powder particle diameter $\Phi_T$, the diagram at center being a view as seen from the side of arrayal of pile, and the diagram at right being arrayal of pile when deflection is at a maximum (when pile makes contact). (b) at FIG. 9 shows an exemplary model of pile gaps, pile gaps as seen from the front being shown at left, and the diagram at center being a view as seen from the side of pile gaps where there is mutual overlapping of pile.

$$\text{Porosity (\%) within pile} = \left[\frac{\{(P/2) - \Phi_F\}}{(P/2)}\right] \times 100 \quad (4)$$

$$\text{Pushback distance (mm)} \geq \quad (5)$$
cylindrical shaft seal member width (mm) × (pile porosity/100)

Moreover, pushback distance is the distance by which the pile is pushed back toward the interior from the side end of the width of the cylindrical shaft seal member.
Note that when $$P = 2(\Phi_F + 2\Phi_T)$$

1) The number N of fibers per unit area of pile is $$N = (L/P)^2$$

$$= \{L/2(\Phi_F + 2\Phi_T)\}^2$$

2) Pile porosity (when the pile is collapsed) (%) is

Porosity (%)=100{(P/2)−$\Phi_F$}/(P/2)

3) Minimum required pushback distance (mm) is minimum required pushback distance (mm)=porosity×seal width where
N is the number of fibers per unit area of pile;
P is average pitch between pile strands in the cut pile;
$\Phi_F$ is average pile diameter; and
$\Phi_T$ is powder particle diameter.

The larger the size of the gaps between tufts of pile 5 the greater the pushback distance will be, and a large fiber density at pile 5 will make it possible to reduce the distance by which pile 5 that has collapsed in the direction toward the exterior of rotating shaft 1b is pushed back. Furthermore, in accordance with Formula (5), above, because the minimum required pushback distance is not more than approximately 50% of the width of seal member 4f, it is sufficient that this be one-half of the width of seal member 4f, which is the situation shown at FIG. 10. At FIG. 10, 5c indicates pile length, and 5e is the protruding portion, the tips of which constitute the region for which there is overlap with rotating shaft 1b. This protruding portion 5e of the pile is collapsed, in the direction toward the exterior of rotating shaft 1b, along the surface of rotating shaft 1b. By therefore causing a bearing 12 having a spacer-like portion 14a to engage with rotating shaft 1b, the foregoing collapse in the direction toward the exterior is pushed back in the direction toward the interior along rotating shaft 1b, and is pressed onto rotating shaft 1b by a distance (thickness) corresponding to the height of the projection at the spacer-like portion 14a.

Furthermore, when pile 5 is pushed on, because pile 5 is compressed in U-shaped fashion, being pushed on for a distance corresponding to the minimum required pushback distance, the magnitude of the amount of bulge 5g in pile 5 produced due to the fact that pile 5 is pushed on in the opposite direction which is in the direction toward the interior along rotating shaft 1b is approximately ½ the magnitude of the distance pushed back by cylindrical projection 13 or spacer 14 less the minimum required pushback distance, and is thus approximated by Formula (6), below.

Amount of bulge≈(pushback distance−minimum required pushback distance)/2 (6)

Next, examples in accordance with the present invention of means for pushing back tips of pile 5 which has collapsed toward the exterior in the direction along rotating shaft 1b are shown at FIG. 3, FIG. 11, and FIG. 12. With respect to FIG. 3, this is as already described above at paragraph 0029. At FIG. 11, when the necessary pushback distance is such that this be greater than or equal to the width of collapse which is the magnitude of protruding portion 5e at the tips of pile 5, this is a means for pushing back pile 5 to the interior of seal member 4f as a result of provision of a spacer 14 between bearing 12 and seal member 4f at cylindrical shaft seal member 4b in accordance with the present invention. FIG. 12 is a means for pushing pile 5 back toward the ring-like interior of seal member 4f as a result of provision of cylindrical projection 13 at bearing 12. By thus causing bearing 12 and spacer 14 mounted on rotating shaft 1b as shown at (b) in FIG. 11 to push pile 5 back toward the ring-like interior of seal member 4f as shown at (a) in FIG. 11, it is possible to cause the tips of pile 5 to be directed toward the interior of rotating shaft 1b. This fact makes it possible to cause the direction of collapse due to collapse of tips of pile 5 to be formed at the interior of seal member 4f, and makes it possible to achieve a structure in which there is no leakage and in which flow of powder 3 is controlled. Or instead of spacer 14 at FIG. 11, at FIG. 12, as shown at (c) therein, a cylindrical projection 13 constituting a spacer-like portion 14a may be provided such that it is constituted in integral fashion with the bearing 12 itself, projection 13 shown at (b) in this FIG. 12 being engaged with rotating shaft 1b such that bearing 12 which is present at the tip thereof faces in the direction of the arrow, pile 5 constituting cylindrical shaft seal member 4b being pressed toward the interior of rotating shaft 1b as shown at (a) in FIG. 12. The pressing of pile 5 toward the interior by bearing 12 which has this projection 13 at the tip thereof causes increase in the bulge at the tip of pile 5, increasing contact with rotating shaft 1b.

Furthermore, examples of cylindrical shaft seal members 4b in accordance with the present invention and of rotating shaft seal units constituted so as to support such cylindrical shaft seal members 4b are shown at FIG. 13 and FIG. 14. At the tip of the portion where bearing 12 is present at the interior of holder 15a in rotating shaft seal unit 15 at FIG. 13, there is a cylindrical projection 13 for squashing the tips of pile 5 constituting cylindrical shaft seal member 4b toward the interior in the direction along the rotating shaft. As shown at (a) in FIG. 13, a portion that supports cylindrical shaft seal member 4b at rotating shaft seal unit 15 is present in such fashion that it extends from the periphery of cylindrical shaft seal member 4b to constitute holder 15a, a region to the rear of this portion at holder 15a constituting bearing portion 12a of rotating shaft 1b, to constitute rotating shaft seal unit 15. As shown at (b) in FIG. 13, this is such that the rotating shaft seal unit 15 which supports cylindrical shaft seal member 4b is inserted on rotating shaft 1b in the direction of the arrow so as to constitute the rotating shaft seal unit 15 shown at (a). In such a situation, (c) at FIG. 13 shows rotating shaft seal unit 15 having unit retainer 15b at the rear portion thereof, this rotating shaft seal unit 15 being fastened by screws by way of attachment screw holes 15c so as to permit attachment to the back end of support frame 2 shown at (b). Moreover, cylindrical shaft seal member 4b which is supported at the interior of this holder 15a is capable of being removed therefrom.

On the other hand, at rotating shaft seal unit 15 shown at (a) in FIG. 14, the constitution is such that cylindrical shaft seal member 4b at which pile (fibers) 5 are inclined engages with the inside surface of holder 15a at rotating shaft seal unit 15 which engages with the inside diameter surface of ring-like support frame 2, being inserted on the rotating shaft at a location at the interior end of cylindrical shaft seal member 4b, collapse of the inclined pile causing formation of a bulge, sealing of the region peripheral to the hole through which the shaft of the container passes and the interior end of cylindrical shaft seal member 4b being carried out by the pile density and the reactive-force-providing load of the pile. In addition, a space is provided to prevent pile that has collapsed toward the exterior as a result of insertion on the shaft from being entrained at the location of bearing sliding portion 12a, permitting achievement of prevention of entrainment of pile (fiber). Moreover, the constitution is such that the direction in which the pile is inclined or rotation of the shaft produces an action whereby pile moves in the direction of rotation and powder is returned toward the container, so that there is no entry of powder thereinto. (b) at FIG. 14 shows a situation in which rotating shaft seal unit 15—which at the interior of holder 15a has pile 5 constituting cylindrical shaft seal member 4b at which pile is inclined at the interior, and which is provided with an entrainment-preventing space preventing pile entry in which pile enters within bearing sliding portion 12a due to collapse of pile as a result of insertion on the shaft—is moved forward as far as support frame 2 in the direction of the arrow and is engaged with rotating shaft 1b at rotating body 1a. (c) at FIG. 14 shows rotating shaft seal unit 15 having unit retainer 15b at the rear portion thereof, this rotating shaft seal unit 15 being fastened by screws by way of attachment screw holes 15c so as to permit attachment to the back end of support frame 2. This holder 15a which supports and extends from the periphery of cylindrical shaft seal member 4b has, at the interior thereof, bearing 12, which is formed so as to be constituted in integral fashion therewith. Moreover, cylindrical shaft seal member 4b which is supported at the interior of this holder 15a is capable of being removed therefrom. Note that the present invention as constituted indicates but a few examples, rotating shaft seal units of different configurations having entrainment-preventing spaces wherein shaft seal members employ pile in which pile (fiber) 5 is made up of straight fibers, inclined fibers, and/or crimped fibers are also included within the present invention; moreover, the rotating shaft seal unit may also have a constitution in which bearing member(s), sintered member(s), fluorocarbon resin(s), and/or or other such resin sliding member(s) are used at the bearing, which may be constituted in integral fashion therewith, and such constitutions are included within the present invention.

As shown at FIG. 13 and FIG. 14, cylindrical shaft seal member 4b in accordance with the present invention is constituted in integral fashion with bearing 12 to form rotating shaft seal unit 15. There is a sliding portion 12a at bearing 12 provided at holder 15a of this rotating shaft seal unit 15, and the cylindrical shaft seal member 4b which engages with rotating shaft 1b is capable of being replaced through replacement of the rotating shaft seal unit 15. Because replacement of the cylindrical shaft seal member 4b can thus be accomplished not by replacing the entire apparatus but by replacing the component unit of which the apparatus is comprised, there is reduced waste, resources are conserved, and there is improved efficiency during maintenance operations.

FIG. 15 shows a situation in which there is an amount of bulge 5g at pile 5 produced when collapsed tips of pile 5 in accordance with the present invention are pressed on by cylindrical projection 13 having length 13a at the projection at the tip constituting pressing means incorporating bearing 12. This drawing is similar to FIG. 4 indicated above, rotating shaft 1b being inserted through support frame 2 of powder container 1, pile 5 constituting cylindrical shaft seal member 4b being mounted on this rotating shaft 1b, this cylindrical shaft seal member 4b being pressed into by a pushback distance Dc by length 13a of the projection present at cylindrical projection 13 which is also mounted on rotating shaft 1b, as a result of which pile bulge 5f comprising an amount of bulge 5g of pile 5 is formed in a direction behind rotating shaft 1b.

Working Examples

When hole diameter 10a for attachment of cylindrical shaft seal member 4b to hole 10 through which the rotating shaft passes is made to be 10 mm, it is caused to be attached to this hole diameter 10a. To this end, when length of pile 5 was 2 mm, thickness of ground yarn 7c at woven/knit pile fabric 7 was 0.9 mm, fiber density at pile 5 was 467500 threads per in$^2$, and average pile diameter $\Phi_F$ was 13 μm, planar seal member 4f comprising this woven/knit pile fabric 7 was laminated by means of adhesive to an aluminum sheet of thickness 0.3 mm constituting cylindrical support member 4c of outside diameter 4b, this was cut to a width of 3 mm and a length of 29.8 mm to accommodate hole 10 through which the rotating shaft passes, and this was then formed by means of a forming machine to fabricate cylindrical shaft seal member 4b. Note that when this was attached to attachment hole 2a for which diameter 10a of the hole through the rotating shaft passes was 10 mm, gap 8c at linear slit 8 was 0.2 mm-0.3 mm. Furthermore, the portion corresponding to distance 5d to the location at which there is mutual overlap of pile 5 at the portion corresponding to slit 8 was 3.8 mm-4.0 mm from center 4i of cylindrical shaft seal member 4b, the applicable condition being that this should be larger than the 3 mm radius of rotating shaft 1b. Moreover, the applicable amount of overlap of pile 5 with respect to rotating shaft 1b was 1.2 mm.

Cylindrical shaft seal member 4b fabricated as described above was inserted on a stainless steel shaft constituting an attachment shaft 16e having a shaft diameter of 6 mm at a powder container 16b in the vibration testing machine 16 shown at FIG. 16. Note that the diameter of the hole 16d through which attachment shaft 16e at cover 16c of powder container 16b passes was 7 mm, and the diameter of attachment hole 2a at cylindrical shaft seal member 4b was 10 mm. In addition, testing for leakage of powder 3 was carried out with vibration testing machine 16 containing powder 3 under conditions such that frequency was 50 Hz and acceleration was 100 m/s² at vibration source 16a. Evaluation of seal characteristics at cylindrical shaft seal member 4b was such that samples for which there was no leakage of powder 3 after 10 minutes of vibration testing were considered to be OK, while samples for which there was leakage of powder 3 after less than 10 minutes of vibration testing were considered to be NG. Note that adjustment of the amount of bulge 5g at pile 5 was carried out by causing spacer 14 to be provided between cylindrical shaft seal member 4b and the portion corresponding to bearing 12, and varying the diameter and thickness of spacer 14 to adjust the amount of bulge 5g. In addition, amounts of bulge 5g were measured at various points in time, vibration testing being carried out in correspondence to such amounts of bulge 5g.

Next, in agitation testing using an agitation testing machine 17 filled with powder 3 shown in FIG. 17, rotating shaft 17a, which was a shaft made of SUS, and agitation member 17b thereabout were made to rotate to carry out testing of seal characteristics at cylindrical shaft seal member 4b. Conditions for agitation testing were such that rotations in direction of rotation 17c at rotating shaft 17a and agitation member 17b in agitation testing machine 17 was 400 rpm, samples for which there was no leakage after 10 hours being considered to be OK, and samples for which there was leakage after a time less than this, i.e., 1 hour, being considered to be NG.

Test results for Working Examples 1 through 4 and Comparative Examples 1 through 3 are shown in TABLE 1. From TABLE 1, it is clear that bulge 5f of pile 5 is dependent on pushback distance. Furthermore, as can be seen at Comparative Example 1, results of vibration testing indicate that leakage occurred when there was no bulge and there was formation of a gap relative to attachment shaft 16e. Moreover, results of agitation testing also likewise indicated that sample(s) were NG, leakage occurring after 1 hour, when there was no bulge and there was formation of a gap relative to attachment shaft 16e.

TABLE 1

| | Location of pile overlap (distance from center) (mm) | Container hole diameter (mm) | Rotating shaft diameter (mm) | Slit width (mm) | Amount of pressing into seal member interior from seal member end (mm) | Pushback distance from pile tip (mm) | Amount of pile bulge (mm) | | Distance in direction of shaft to wall in region peripheral to hole at container (mm) | Seal characteristics test results | |
|---|---|---|---|---|---|---|---|---|---|---|---|
| | | | | | | | Calculated value | Measured value | | Vibration testing Acceleration: 100 m/sec² (Time: 10 mm) | Agitation testing (400 rpm) Shaft diameter: φ 6 (SUS) |
| Working Example 1 | 3.8 | φ 7 (radius = 3.5) | φ 6 (SUS) (radius = 3.0) | 0.2 | −0.25 | 1.3 | 0.200 | 0.10 | 0 | OK | OK (10 hr) |
| Working Example 2 | 3.9 | φ 7 (radius = 3.5) | φ 6 (SUS) (radius = 3.0) | 0.2 | 0 | 1.55 | 0.333 | 0.25 | 0 | OK | OK (10 hr) |
| Working Example 3 | 3.9 | φ 7 (radius = 3.5) | φ 6 (SUS) (radius = 3.0) | 0.2 | 1 | 2.55 | 0.833 | 0.68 | 0 | OK | OK (10 hr) |
| Working Example 4 | 3.8 | φ 7 (radius = 3.5) | φ 6 (SUS) (radius = 3.0) | 0.2 | 2 | 3.55 | 1.333 | 1.17 | 0 | OK | OK (10 hr) |
| Comparative Example 1 | 3.9 | φ 7 (radius = 3.5) | φ 6 (SUS) (radius = 3.0) | 0.2 | 0 | 1.05 | 0.088 | −0.10 | 0.1 | NG | NG (1 hr) |
| Comparative Example 2 | 3.9 | φ 8 (radius = 4.0) | φ 6 (SUS) (radius = 3.0) | 0.2 | 0 | 1.55 | 0.333 | 0.25 | 0 | NG | NG (1 hr) |
| Comparative Example 3 | 2.8 | φ 7 (radius = 3.5) | φ 6 (SUS) (radius = 3.0) | 1.0 | 0 | 1.55 | 0.333 | 0.25 | 0 | NG | NG (1 hr) |

Moreover, for attachment of cover 16c to attachment shaft 16e at powder container 16b, making the radius of the hole 16d provided at cover 16c smaller than the distance from center 4i of cylindrical shaft seal member 4b, i.e., the distance corresponding to the portion where there is overlap of pile 5, caused seal characteristics in terms of prevention of leakage of powder 3 to be OK. In contradistinction hereto, making the radius of the hole 16d at powder container 16b larger than the distance from center 4i of cylindrical shaft seal member 4b, which is to say the distance corresponding to where there is overlap of pile 5 caused occurrence of leakage of powder 3, resulting in samples that were NG, as indicated at Comparative Examples 2 and 3. Furthermore, with respect to the width of slit 8, making width large as at Comparative Example 3 causes the distance 5d to the location at which there is mutual overlap of pile 5 to be approached; which is to say that the distance from the center becomes small, and making this less than the radius of hole 16d at powder container 16b and the radius of attachment shaft 16e produces a result in which there is leakage of powder 3, resulting in samples that were NG.

Based on the foregoing test results, even where there is a linear slit width Ws which is 8a, the cylindrical shaft seal member 4b in accordance with the present invention, including usage conditions, as a result of adoption of a condition such that a distance 5d to a location at which there is mutual overlap of pile 5 from portions corresponding to the slit 8 is larger than the radius of the shaft at the applicable rotating shaft 1b, and as a result of adoption of a constitution in which bulge 5f at pile 5 is provided and there is contact with a wall 10b in a region peripheral to a hole 10 through which the rotating shaft at powder container 9 passes, permits prevention of leakage of powder 3. Furthermore, based upon consideration of the safety margin with respect to the width direction of cylindrical shaft seal member 4b, it is more preferred that pressing of pile 5 extend to the interior of seal member 4f.

Examples are respectively shown in which cylindrical shaft seal member 4b in accordance with the present invention is, as shown at (a) in FIG. 18, employed at a rotating shaft 1b in a supply roller 1h in the context of a support frame 2 at a toner container or the housing of a developer case in, for example, an electrophotographic image-forming device; or is, as shown at (b) in FIG. 18, employed at rotating shaft 1b at an agitating roller 1j, i.e., an agitator, in the context, as above, of a support frame 2 at a toner container or the housing of a developer case in an electrophotographic image-forming device.

The graph at FIG. 19 shows theoretical calculated results for the gap at hole diameter 10a at the hole through which the rotating shaft at powder container 9 passes and rotating shaft 1b, and the relationship between width of slit 8 in a cylindrical shaft seal member 4b in accordance with the present invention and the required divergence angle θ of the pile after pile yarn 7a at woven/knit pile fabric 7 has been spread out. As shown in this graph, it is clear that if, for example, the divergence angle θ of the pile is less than or equal to 15 degrees, it is preferred that the width of the slit 8 at the time of attachment be less than or equal to 0.3 mm; and if some safety margin is to be provided above and beyond this, this can be accommodated by increasing the size of the divergence angle θ of the pile or by decreasing the size of the diameter 10a of the hole through which the rotating shaft at powder container 9 passes.

The graph at FIG. 20 shows results of long-term agitation leakage testing which was carried out using cylindrical shaft seal member 4b in accordance with the present invention. These results indicate that, for both a metal shaft made of stainless steel (SUS) and polyoxymethylene resin (POM), leakage of powder 3 was at Level 5, i.e., no leakage occurred, even after long-term testing for 200 hours.

Furthermore, the graph at FIG. 21 shows results of agitation leakage testing involving comparison of a conventional rubber seal member and cylindrical shaft seal member 4b in accordance with the present invention. Here, the result of comparison employing a rotating shaft 1b having a step in the form of a parting line, the rotating shaft 1b being a shaft made of ABS resin having a step of 0.05 mm, was that whereas leakage of powder 3 occurred within on the order of 5 minutes with the conventional rubber seal member, no problem occurred even after 200 hours of carrying out rotation with agitation, demonstrating capability of application even to a rotating shaft 1b having a step, and permitting contribution with respect to reduction in cost of the rotating shaft 1b, when cylindrical shaft seal member 4b in accordance with the present invention was employed. With respect to treatment of the surface of pile 5, note that testing was carried out after applying on the order of 2 mg of silicone oil thereto for the purpose of preventing tearing due to the step.

As is clear from the foregoing results, the results were such that there was no problem despite application of a small amount of oil to the surface of pile 5, and the cylindrical shaft seal member 4b of the present invention also includes members for which such treatment through application of oil to pile 5 has been carried out.

EXPLANATION OF REFERENCE NUMERALS

1 Powder-handling apparatus (powder container)
1a Rotating body (rotating apparatus)
1b Rotating shaft (shaft)
1c Rotating shaft radius
1d Center (of rotating shaft)
1e End of rotating shaft
1f Rotating shaft direction
1g Leakage-preventing region
1h Supply roller
1i Gear
1j Agitating roller (agitator)
2 Support frame
2a Attachment hole
2b Hole diameter (inside diameter)
3 Powder (toner)
4 Planar seal member
4a Planar pile support member (aluminum)
4b Cylindrical shaft seal member
4c Cylindrical support member
4d Inside diameter (inside circumference)
4e Outside diameter (outside circumference)
4f Seal member
4g Inside diameter (of ground yarn)
4h Outer ring support member (aluminum)
4i Center
5 Pile
5a Location where pile contacts rotating shaft
5c Pile length
5d Distance to location where pile overlaps
5e Pile tip protruding portion
5f Pile bulge
5g Amount of bulge (width)
6 Member having structure permitting enlargement
7 Woven/knit pile fabric
7a Pile yarn
7b Cut pile
7c Ground yarn
7d Warp yarn
7e Weft yarn
7f Adhesive layer
8 Slit
8a Slit width Ws
8b End (of slit)
8c Gap
9 Powder container
10 Hole through which rotating shaft passes
10 Diameter of hole through which rotating shaft passes
10b Wall at periphery
11 Planar support member
12 Bearing
12a Sliding portion (of bearing)
13 Cylindrical projection
13a Projection length
14 Spacer
14a Spacer-like portion (cylindrical projection)
15 Rotating shaft seal unit
15a Holder
15b Unit retainer
15c Attachment screw hole
15d Tip (of holder)
15e Rear (of holder)
16 Vibration testing machine
16a Vibration source
16b Powder container
16c Cover
16d Hole
16e Attachment shaft
16f Angle bar
16g Pickup sensor 16h Direction of acceleration due to vibration
17 Agitation testing machine
17a Rotating shaft
17b Agitation member
17c Direction of rotation
θ Pile divergence angle
I Pile fiber length
δ Amount of overlap of pile at rotating shaft
N Number of fibers of pile per unit area
L Length per unit length of the cylindrical shaft seal member
$\Phi_F$ Average pile diameter of cut pile or pile used at woven/knit pile fabric
$\Phi_t$ Powder particle diameter
P Average pitch between pile strands in cut pile
$\Phi_B$ Diameter of hole through which rotating shaft passes
Dp Distance from center of hole through which rotating shaft passes to location where pile overlaps
Dc Pushback distance

The invention claimed is:

1. A cylindrical shaft seal unit to prevent leakage of powder from a rotating apparatus that handles powder, comprising:
a support frame having an attachment hole and a bearing that supports rotating shaft;
a cylindrical shaft seal member fitted in the attachment hole; and
a rotating shaft supported by the bearing,
wherein the cylindrical shaft seal member comprises:
pile fabric comprising cut pile of woven fabric formed on one side of the pile fabric, and
a cylindrical support member which supports the pile fabric, the cylindrical support member made of elastic material and having a slit to permit shrinkage and expansion of an outside diameter depending on external pressure,
wherein an outside diameter of the cylindrical shaft seal member being slightly larger than that of the attachment hole, and the cylindrical shaft seal member fits in the attachment hole by springback of the cylindrical shaft seal member;
wherein a distance from a center of the cylindrical shaft seal member to a location where there is overlap of pile from edges of the slit is larger than a radius of the rotating shaft, and a radius of a hole, through which the rotating shaft provided at a powder container passes, is made smaller than the distance, and
wherein the pile fabric is pushed by a pile pusher to contact a wall having the hole through which the rotating shaft of the container passes.

2. A cylindrical shaft seal unit according to claim 1, wherein
the cut pile is chosen from pile in which straight fibers are made to spread out, pile in which straight fibers are made to be inclined, and pile in which there are crimped fibers.

3. A cylindrical shaft seal unit according to claim 1, wherein the cylindrical support member is formed from a planar support member comprising a rubber, a resin, or a metal.

4. A cylindrical shaft seal unit according to claim 1, wherein the cut pile comprising woven/knit pile fabric at the cylindrical shaft seal member is made up of natural fibers or synthetic fibers; and Formulae (1) to (5) are satisfied:

$$[L/\{2\times(2\Phi_t+\Phi_F)\}]^2 < N \leq [L/(2\times\Phi_F)]^2 \qquad (1),$$

$$\delta > I - [I\times\{(\Phi_F+2\Phi_t)/P\}] \qquad (2),$$

$$P = L/(N)^{1/2} \qquad (3),$$

$$\text{porosity (\%) within pile} = \left[\frac{\{(P/2)-\Phi_F\}}{(P/2)}\right] \times 100 \qquad (4)$$

and $$\text{pushback distance (mm)} \geq \qquad (5)$$
$$\text{cylindrical shaft seal member width} \times (\text{pile porosity}/100)$$

wherein N is number of fibers per unit area, L is unit length at one side of the square constituting unit area, $\Phi_F$ is average diameter of fiber in pile at cut pile or average diameter of fiber in pile used at the pile fabric, $\Phi_t$ is powder particle diameter, δ is overlap of the pile at the rotating shaft, I is length of the fibers, P is average pitch between fibers in pile at cut pile, a pushback distance is a distance the pile bent toward the exterior is pushed back by the pile pusher, when the cylindrical shaft seal member is inserted on the rotating shaft, toward the interior along the rotating shaft direction from a location at the tip of the pile.

5. A rotating shaft seal unit according to claim 1, wherein the cylindrical shaft seal member and the bearing are integrally formed.

6. A cylindrical shaft seal unit according to claim 2, wherein the cut pile comprising woven/knit pile fabric at the cylindrical shaft seal member is made up of natural fibers or synthetic fibers; and Formulae (1) to (5) are satisfied:

$$[L/\{2\times(2\Phi_{t1}-\Phi_F)\}]^2 < N \leq [L/(2\times\Phi_F)]^2 \qquad (1),$$

$$\delta > I - [I\times\{(\Phi_F+2\Phi_t)/P\}] \qquad (2),$$

$$P = L/(N)^{1/2} \qquad (3),$$

$$\text{porosity (\%) within pile} = \left[\frac{\{(P/2)-\Phi_F\}}{(P/2)}\right] \times 100 \qquad (4)$$

and $$\text{pushback distance (mm)} \geq \qquad (5)$$
$$\text{cylindrical shaft seal member width} \times (\text{pile porosity}/100)$$

wherein N is number of fibers per unit area, L is unit length at one side of the square constituting unit area, $\Phi_F$ is average diameter of fiber in pile at cut pile or average diameter of fiber in pile used at the pile fabric, $\Phi_t$ is powder particle diameter, δ is overlap of the pile at the rotating shaft, I is length of the fibers, P is average pitch between fibers in pile at cut pile, and the pushback distance is a distance the pile bent toward the exterior is pushed back by the pile pusher, when the cylindrical shaft seal member is inserted on the rotating shaft, toward the interior along the rotating shaft direction from a location at the tip of the pile.

7. A cylindrical shaft seal unit according to claim 3, wherein the cut pile comprising woven/knit pile fabric at the cylindrical shaft seal member is made up of natural fibers or synthetic fibers;
and Formulae (1) to (5) are satisfied:

$$[L/\{2\times(2\Phi_t+\Phi_F)\}]^2 < N \leq [L/(2\times\Phi_F)]^2 \qquad (1),$$

$$\delta > I - [I\times\{(\Phi_F+2\Phi_t)/P\}] \qquad (2),$$

$$P = L/(N)^{1/2} \quad (3),$$

$$\text{porosity (\%) within pile} = \left[\frac{\{(P/2) - \Phi_F\}}{(P/2)}\right] \times 100 \quad (4)$$

and pushback distance (mm) ≥ (5)
cylindrical shaft seal member width × (pile porosity/100)

wherein N is number of fibers per unit area, L is unit length at one side of the square constituting unit area, $\Phi_F$ is average diameter of fiber in pile at cut pile or average diameter of fiber in pile used at the pile fabric, $\Phi_t$ is powder particle diameter, δ is overlap of the pile at the rotating shaft, l is length of the fibers, P is average pitch between fibers in pile at cut pile, and the pushback distance is a distance the pile bent toward the exterior is pushed back by the pile pusher, when the cylindrical shaft seal member is inserted on the rotating shaft, toward the interior along the rotating shaft direction from a location at the tip of the pile.

8. A cylindrical shaft seal unit according to claim 2, wherein the cylindrical shaft seal member and the bearing which supports and slides along the rotating shaft are integrally and a space for preventing entrainment of pile by the bearing portion is provided between the shaft seal member and the bearing portion.

9. A rotating shaft seal unit according to claim 3, wherein the cylindrical shaft seal member and the bearing are formed in such fashion that the cylindrical shaft seal member and the bearing which supports and slides along the rotating shaft are integrally constituted; and a space for preventing entrainment of pile by the bearing portion is provided between the shaft seal member and the bearing portion.

10. A rotating shaft seal unit according to claim 4, wherein the cylindrical shaft seal member and the bearing are formed in such fashion that the cylindrical shaft seal member and the bearing which supports and slides along the rotating shaft are integrally constituted; and a space for preventing entrainment of pile by the bearing portion is provided between the shaft seal member and the bearing portion.

11. A cylindrical shaft seal unit according to claim 1, wherein the pile pusher pressing the pile bent toward the exterior along the rotating shaft, the pile pusher comprising the bearing which supports the rotating shaft, a cylindrical projection which is formed at the bearing, and a spacer which is provided between the cylindrical shaft seal member and the bearing.

12. A cylindrical shaft seal unit according to claim 1, wherein a space for preventing entrainment of pile by the bearing portion is provided between the shaft seal member and the bearing portion.

13. A cylindrical shaft seal unit according to claim 1, wherein a cylindrical projection different from the sliding portion of the bearing is provided at an inside surface of said bearing, said cylindrical projection being constituted integrally with respect to the cylindrical shaft seal member, said cylindrical projection causing the fibers of the pile to be directed toward the interior which is in the direction of the rotating shaft.

14. A cylindrical shaft seal unit according to claim 2, wherein a cylindrical projection different from the sliding portion of the bearing is provided at an inside surface of said bearing, said cylindrical projection being constituted integrally with respect to the cylindrical shaft seal member, said cylindrical projection causing the fibers of the pile to be directed toward the interior which is in the direction of the rotating shaft.

15. A rotating shaft seal unit according to claim 3, wherein a cylindrical projection different from the sliding portion of the bearing is provided at an inside surface of said bearing, said cylindrical projection being constituted in integrally with respect to the cylindrical shaft seal member, said cylindrical projection causing the fibers of the pile to be directed toward the interior which is in the direction of the rotating shaft.

16. A rotating shaft seal unit according to claim 4, wherein a cylindrical projection different from the sliding portion of the bearing is provided at an inside surface of said bearing, said cylindrical projection being constituted in integrally with respect to the cylindrical shaft seal member, said cylindrical projection causing the fibers of the pile to be directed toward the interior which is in the direction of the rotating shaft.

* * * * *